(12) United States Patent
Cui et al.

(10) Patent No.: US 12,529,314 B2
(45) Date of Patent: Jan. 20, 2026

(54) METHOD FOR TRAINING COAL ROCK INTERFACE RECOGNITION MODEL, METHOD FOR CUTTING CONTROL OF SHEARER, AND INTELLIGENT CONTROL SYSTEM

(71) Applicants: CCTEG BEIJING TIANMA INTELLIGENT CONTROL TECHNOLOGY CO., LTD., Beijing (CN); BEIJING CCRI-TIANMA AUTOMATION TECHNOLOGY CO., LTD., Beijing (CN)

(72) Inventors: Yao Cui, Beijing (CN); Sen Li, Beijing (CN); Shoubin Li, Beijing (CN); Zeyu Qin, Beijing (CN); Zhuang Ye, Beijing (CN); Jie Xia, Beijing (CN)

(73) Assignees: CCTEG BEIJING TIANMA INTELLIGENT CONTROL TECHNOLOGY CO., LTD., Beijing (CN); BEIJING CCRI-TIANMA AUTOMATION TECHNOLOGY CO., LTD., Beijing (CN)

( * ) Notice: Subject to any disclaimer, the term of this patent is extended or adjusted under 35 U.S.C. 154(b) by 79 days.

(21) Appl. No.: 18/699,509

(22) PCT Filed: Jun. 10, 2022

(86) PCT No.: PCT/CN2022/098271
§ 371 (c)(1),
(2) Date: Apr. 8, 2024

(87) PCT Pub. No.: WO2023/236221
PCT Pub. Date: Dec. 14, 2023

(65) Prior Publication Data
US 2024/0410279 A1 Dec. 12, 2024

(30) Foreign Application Priority Data

Jun. 7, 2022 (CN) .......................... 202210635956.3

(51) Int. Cl.
*E21C 35/00* (2006.01)
*G06V 10/80* (2022.01)
*G06V 10/82* (2022.01)

(52) U.S. Cl.
CPC .......... *E21C 35/302* (2023.05); *G06V 10/806* (2022.01); *G06V 10/82* (2022.01)

(58) Field of Classification Search
CPC ..... E21C 35/302; G06V 10/806; G06V 10/82
See application file for complete search history.

(56) References Cited

U.S. PATENT DOCUMENTS 6,781,130 B2 * 8/2004 Frederick ................. G01V 5/00
250/361 R

FOREIGN PATENT DOCUMENTS

AU 2016200784 B1 * 6/2016 ............. E21C 35/08

* cited by examiner

*Primary Examiner* — Janine M Kreck
(74) *Attorney, Agent, or Firm* — The Sun IP Law

(57) ABSTRACT

A method for training a coal rock interface recognition model is performed by a cloud server. The method includes receiving a sample coal rock distribution and sample multi-modal data from an edge processor, acquiring a sample load state feature based on the sample vibration data and the sample noise data; acquiring a sample cutting feature of a coal rock interface based on the sample video data. The method further includes acquiring a sample load feature for drum cutting based on the sample current data and the sample pressure data; calling the coal rock interface recognition model, and performing a decision-level fusion based on the sample load state feature; and training the coal rock interface recognition model based on the sample predicted (Continued)

coal rock distribution and the sample coal rock distribution to obtain a target coal rock interface recognition model.

18 Claims, 11 Drawing Sheets

METHOD FOR TRAINING COAL ROCK INTERFACE RECOGNITION MODEL, METHOD FOR CUTTING CONTROL OF SHEARER, AND INTELLIGENT CONTROL SYSTEM

CROSS-REFERENCE TO RELATED APPLICATIONS

This application is the U.S. national phase application of International Application No. PCT/CN2022/098271, filed on Jun. 10, 2022, which is based on and claims priority to Chinese Patent Application No. 202210635956.3, filed on Jun. 7, 2022, the entire contents of which are incorporated herein by reference.

TECHNICAL FIELD

The disclosure relates to a technical field for an intelligent control of coal mine production, and specifically to a method for training a coal rock interface recognition model, a method for cutting control of a shearer, and an intelligent control system.

BACKGROUND

In the related art, an image acquisition sensor acquires images of a coal working surface, and a pre-trained image recognition model is used to identify the images. A height of a shearer is controlled based on an image recognition result to automatically cut a coal seam.

However, a recognition accuracy for a single image modality is not high, resulting in poor performance of automatically cutting the coal seam.

SUMMARY

In a first aspect, a method for training a coal rock interface recognition model is proposed, which is performed by a cloud server. The method includes: receiving a sample coal rock distribution and sample multi-modal data from an edge processor, in which the sample multi-modal data includes sample current data of a cutting motor, sample pressure data of a lift cylinder, sample vibration data of a cutting arm, sample noise data during cutting coal rocks and sample video data for drum cutting; acquiring a sample load state feature based on the sample vibration data and the sample noise data; acquiring a sample cutting feature of a coal rock interface based on the sample video data; acquiring the sample load feature for drum cutting based on the sample current data and the sample pressure data; calling the coal rock interface recognition model, and performing a decision-level fusion based on the sample load state feature, the sample cutting feature and the sample load feature to generate a sample predicted coal rock distribution; and training the coal rock interface recognition model based on the sample predicted coal rock distribution and the sample coal rock distribution to obtain a target coal rock interface recognition model.

In a second aspect, a method for cutting control of a shearer is proposed, which is performed by an edge processor. The method includes: receiving a trained coal rock interface recognition model from a cloud server, in which the trained coal rock interface recognition model is obtained after training according to the method of the first aspect; acquiring current data of a cutting motor, pressure data of a lift cylinder, vibration data of a cutting arm, noise data during cutting coal rocks and video data for drum cutting; acquiring a load state feature based on the vibration data and the noise data; acquiring a cutting feature of a coal rock interface based on the video data; acquiring a load feature for drum cutting based on the current data and the pressure data; calling the target coal rock interface recognition model, and generating a predicted coal rock distribution based on the load state feature, the cutting feature and the load feature; determining a target drum height and a target traction speed based on the predicted coal rock distribution; and sending the target drum height and the target traction speed to a controller of the shearer, so that the shearer is controlled to cut a coal seam.

In a third aspect, an intelligent control system is provided, including: a shear, configured to cut a coal seam; a controller, configured to control a shear to cut the coal seam; a current sensor, configured to acquire current data of a cutting motor; a pressure sensor, configured to acquire pressure data of a lift cylinder; a vibration sensor, configured to acquire vibration data of a cutting arm; a sound sensor, configured to acquire noise data during cutting coal rocks; a video acquisition device, configured to acquire video data for drum cutting; a cloud server, configured to obtain a target coal rock interface recognition model by training a coal rock interface recognition model based on a sample coal rock distribution and sample multi-modal data from an edge processor, wherein the sample multi-modal data comprises: sample current data of the cutting motor, sample pressure data of the lift cylinder, sample vibration data of the cutting arm, sample noise data during cutting coal rocks and sample video data for drum cutting; and an edge processor, configured to acquire a load state feature based on the vibration data and the noise data; acquire a cutting feature of a coal rock interface based on the video data; acquire a load feature for drum cutting based on the current data and the pressure data; receive the target coal rock interface recognition model from the cloud server, and generate a predicted coal rock distribution based on the load state feature, the cutting feature and the load feature; determine a target drum height and a target traction speed based on the predicted coal rock distribution; and send the target drum height and the target traction speed to the controller.

BRIEF DESCRIPTION OF THE DRAWINGS

In order to explain technical solutions in the embodiments of the disclosure more clearly, the drawings described in the embodiments of the disclosure will be briefly introduced below.

DETAILED DESCRIPTION

Figure 1:
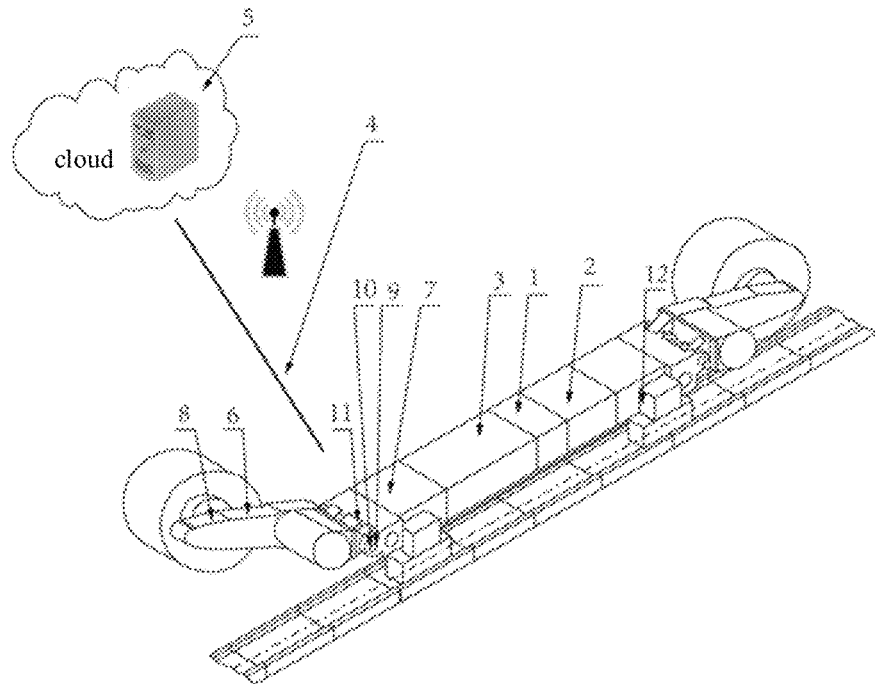
FIG. 1 is a structural diagram illustrating an intelligent control system for a shearer according to an embodiment of the present disclosure.

Embodiments of the disclosure will be described in detail and examples of the embodiments are illustrated in the drawings. The same or similar elements and the elements having the same or similar functions are denoted by same or similar reference numerals throughout the drawings. Embodiments described herein with reference to drawings are explanatory, serve to explain the disclosure, and are not construed to limit the embodiments of the disclosure.

A method for training a coal rock interface recognition model, and a method and an apparatus for cutting control of a shearer according to the embodiments of the present disclosure are described with reference to the attached drawings.

By implementing the embodiments of the disclosure, the sample coal rock distribution and the sample multi-modal data are received from the edge processor. The sample multi-modal data includes sample current data of the cutting motor, sample pressure data of the lift cylinder, sample vibration data of the cutting arm, sample noise data during cutting coal rocks and sample video data for drum cutting. The sample load state feature is acquired based on the sample vibration data and the sample noise data. The sample cutting feature of the coal rock interface is acquired based on the sample video data. The sample load feature for drum cutting is acquired based on the sample current data and the sample pressure data. The coal rock interface recognition model is called, and a decision-level fusion is performed based on the sample load state feature, the sample cutting feature and the sample load feature to generate a sample predicted coal rock distribution; and a model training update is performed on the coal rock interface recognition model based on the sample predicted coal rock distribution and the sample coal rock distribution, so as to obtain a trained coal rock interface recognition model. Therefore, the coal rock interface recognition model may be trained online in real time based on the multi-modal data in combination with a real-time working condition, which may improve the training efficiency and the accuracy of the coal rock interface recognition model.

Before the method for training the coal rock interface recognition model and the method for cutting control of the shearer according to the embodiments of the disclosure are described, an intelligent control system for a shearer to which the method for training the coal rock interface recognition model and the method for cutting control of the shearer are applicable is described first.

FIG. 1 is a structural diagram illustrating an intelligent control system for a shearer according to an embodiment of the present disclosure.

As illustrated in FIG. 1, the intelligent control system for the shearer according to the embodiment of the present disclosure includes a shearer 1, a shearer controller 2, an edge processor 3, a 5G network layer 4, a cloud server 5, and a Hall high-current sensor 6, a pressure sensor 7, a vibration sensor 8, a sound sensor 9, a camera 10, a tilt sensor 11 and a position encoder 12.

The shearer controller 2, the camera 10, and the sound sensor 9 are mounted in the middle of the shearer. The shearer controller 2 is responsible for controlling a traction motor and adjusting a height of a hydraulic cylinder, thereby controlling a traction speed and a drum height when the shearer performs cutting. The camera 10 captures a coal rock image during the cutting, and the sound sensor 9 acquires sounds when cutting a coal wall.

The Hall high-current sensor 6 is mounted on a cutting motor to acquire a cutting current signal, the pressure sensor 7 is mounted inside a lift cylinder of a cutting arm to acquire a cylinder pressure signal, and the vibration sensor 8 is mounted on the cutting arm to acquire a vibration signal when cutting the coal rocks. The tilt sensor 11 is mounted inside a wiring cavity of the cutting motor to detect an angle of the cutting arm, further to obtain the drum height. The position encoder 12 is mounted at axial positions of high-speed and low-speed axises of a shearer traction box, and is configured to measure a position and a traction speed of the shearer on the working surface.

The edge processor 3 includes a server and a switch. The server and the switch are mounted inside the shearer. The switch is connected to the server and a customer premises equipment (CPE) of the 5G network layer 4. The switch is also connected to a sensor (the above device for measuring data, including: the camera 10, the sound sensor 9, the Hall high-current sensor 6, the pressure sensor 7, the tilt sensor 11 and the position encoder 12), and the switch achieves the access, convergence and transmission of sensor data and model parameters. The server implements functions such as data preprocessing, state pushing, state identification, task issuing, and collaborative operation.

The 5G network layer 4 includes a switch, a base station controller, a 5G base station (gNB), and a CPE.

In embodiments of the disclosure, the switch may be a 980C switch. The 980C switch may be mounted in a ground computer room. The base station controller may include a first base station controller BBU (i.e., a baseband unit) and a second base station controller RHUB (i.e., a remote radio unit hub, being a radio frequency remote CPRI data convergence unit). One BBU of mine frameproof and Intrinsically safety is mounted on an underground machine head. One RHUB of mine frameproof and intrinsically safety is mounted on an equipment train beside a console. One 5G base station is mounted on an emulsification pump liquid-returning filter truck; one 5G base station is mounted on an eighth pipeline truck near a self-moving tail; one 5G base station is mounted on the 18$^{th}$ hydraulic support of the working surface; one 5G base station is mounted on the 60$^{th}$ hydraulic support of the working surface; one 5G base station is mounted on the 103$^{th}$ hydraulic support of the working surface 103; and a CPE, including a transmitting antenna, is mounted on a body of the shearer.

In embodiments of the disclosure, the 980C switch may achieve the access, convergence and transmission of a large-capacity 5G network.

The first base station controller BBU may also be referred to as a baseband processing unit that centrally controls and manages the entire base station system. The first base station controller BBU is mainly responsible for processing a baseband signal, including FFT/IFFT, modulation/demodulation and channel encoding/decoding. The first base station controller BBU supports a plug-in modular structure. Users may configure different numbers of baseband processing boards based on different network capacity requirements, and support baseband resource sharing.

The second base station controller RHUB is a radio frequency remote CPRI data convergence unit that achieves an access bridge between the first base station controller BBU and a 5G pico remote radio unit (pRRU). The second base station controller RHUB has an ability to cascade with BBU25GE and has an 8-way pRRU access capability.

In embodiments of the disclosure, the 5G base station may be a KT618 (5G)-F mine pRRU with a type of explosion-proof and intrinsically safety, also known as a radio frequency remote processing unit, which mainly includes a high-speed interface module, a signal processing unit, a power amplifier unit, a duplexer unit, an expansion interface and a power module. The device receives downlink baseband data from the second base station controller RHUB, and sends uplink baseband data to the second base station controller RHUB to implement communication with the first base station controller BBU. The process of sending a signal is modulating a baseband signal to a transmitting frequency band, performing filtering and amplification processing, and transmitting the processed signal via an antenna. The process of receiving a signal is receiving a radio frequency signal from the antenna, down-converting the received signal to an intermediate frequency signal, performing an amplification processing and an analog-to-digital conversion (A/D conversion) and sending the processed signal to the first base station controller BBU for processing. An external antenna is supported. A multi-frequency and multi-modal flexible configuration is supported. The CPE is responsible for converting a high-speed 5G signal into a WiFi signal, so as to communicate with a 5G base station.

The switch is connected to the base station controller and an algorithm server of a central cloud node 5, the base station controller is connected to the 5G base station, and the 5G base station is connected to the CPE. Due to a low latency, a large bandwidth and a flexible slicing technology of the 5G network, real-time data interaction between the edge processor 3 and the cloud server 5 is achieved to complete data upload of the edge processor 3 and algorithm issuing of the cloud server 5.

The cloud server 5 includes a database, an algorithm server, and a client that are interconnected with each other. The database, the algorithm server and the client are all mounted on the ground. The database is responsible for data management, statistical analysis and other functions. The algorithm server is responsible for state recognition, model training, and task creation. The client implements a state monitoring function.

It should be noted that one or more of devices listed in the above intelligent control system for the shearer may be disposed, and the mounting positions may be adjusted as needed, which are not limited in the embodiments of the present disclosure.

It should be noted that the devices listed in the above intelligent control system for the shearer are only for illustration and do not serve as a specific limitation to the embodiments of the present disclosure. Any one device may be replaced when it is updated and upgraded, which falls within the protection scope of the solution in case of the same function.

In embodiments of the disclosure, based on the above intelligent control system for the shearer, the method for training the coal rock interface recognition model and the method for cutting control of the shearer are provided.

Figure 2:
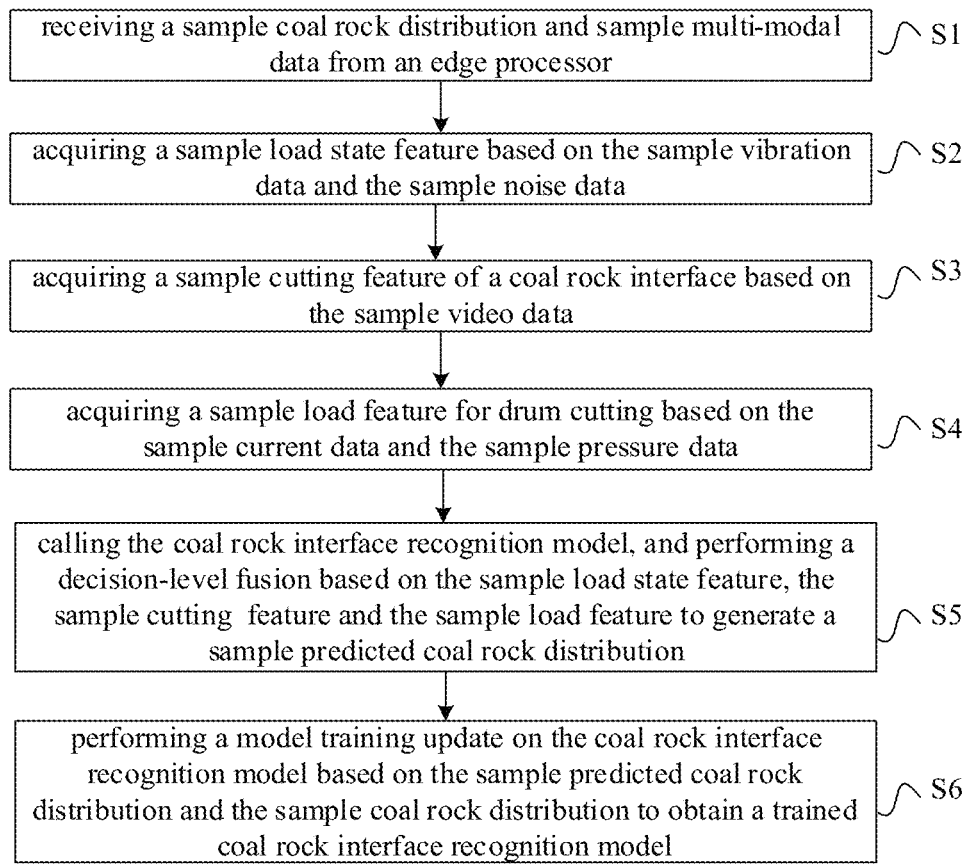
FIG. 2 is a flowchart illustrating a method for training a coal rock interface recognition model according to an embodiment of the present disclosure.

FIG. 2 is a flowchart illustrating a method for training a coal rock interface recognition model according to an embodiment of the present disclosure.

As illustrated in FIG. 2, the method for training the coal rock interface recognition model according to the embodiment of the disclosure is performed by a cloud server, and includes but not limited to following steps.

At S1, a sample coal rock distribution and sample multi-modal data are received from an edge processor. The sample multi-modal data includes: sample current data of a cutting motor, sample pressure data of a lift cylinder, sample vibration data of a cutting arm, sample noise data during cutting coal rocks and sample video data for drum cutting.

In embodiments of the disclosure, multi-modal data and coal rock distribution are acquired by measurement devices such as a Hall high-current sensor, a pressure sensor, a vibration sensor, a sound sensor, a camera, a tilt sensor and a position encoder in real time.

The current data of the cutting motor is acquired by the Hall high-current sensor, the pressure data of the lift cylinder is acquired by the pressure sensor, the vibration data of the cutting arm is acquired by the vibration sensor, the noise data during cutting coal rocks is acquired by the sound sensor, the video data for drum cutting is acquired by the camera, a drum height is acquired by the tilt sensor, and a position and a traction speed of the shearer on the working surface are acquired by the position encoder.

In embodiments of the disclosure, the coal rock distribution may be the drum height, and the position and the traction speed of the shearer on the working surface, or a coal rock distribution position and a coal rock distribution ratio that are determined based on the drum height, and the position and the traction speed of the shearer on the working surface.

Figure 3:
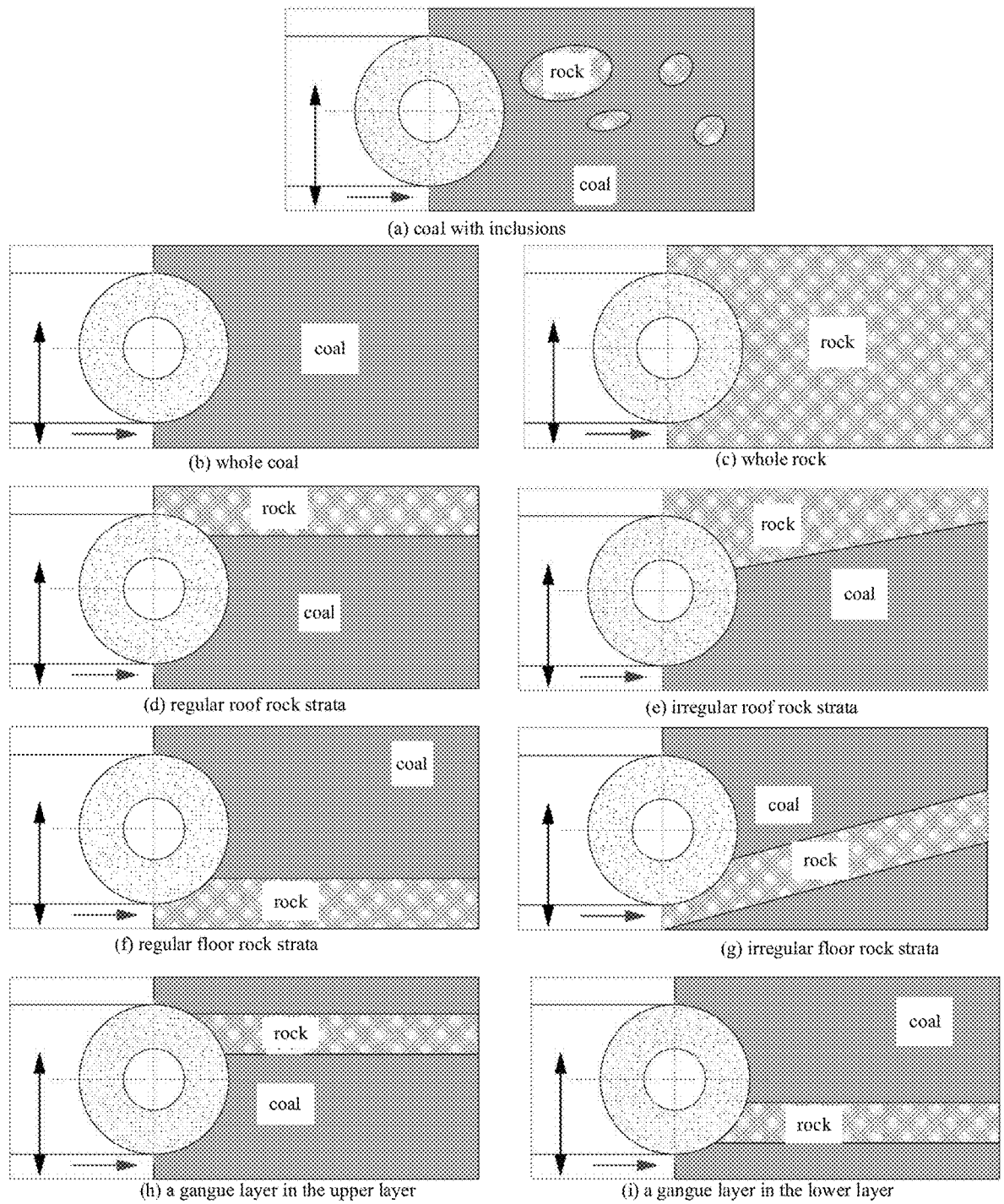
FIG. 3 is a diagram illustrating a coal rock distribution according to an embodiment of the present disclosure.

In an example embodiment, as illustrated in FIG. 3, when the shearer cuts the coal seam on the working surface, rocks in a shape of blocks may be mixed and distributed in a coal seam (as shown in FIG. 3(a)). In this case, the coal rock distribution may be a distribution of a coal seam position and a rock position and a ratio. Alternatively, the coal seam and the rock are distributed in layers without mixing. In this case, the coal rock distribution may be a whole coal (as shown in FIG. 3(b)), a whole rock (as shown in FIG. 3(c)), a regular roof rock strata (as shown in FIG. 3(d)), an irregular roof rock strata (as shown in FIG. 3(e)), a regular floor rock strata (as shown in FIG. 3(f)), an irregular floor rock strata (as shown in FIG. 3(g)), a gangue layer in the upper layer (as shown in FIG. 3(h)), a gangue layer in the lower layer (as shown in FIG. 3(i)), etc.

It needs to be noted that, in embodiments of the disclosure, the edge processor needs to determine the sample multi-modal data and the sample coal rock distribution based on the multi-modal data and the coal rock distribution acquired in real time, and sends the sample multi-modal data and the sample coal rock distribution to the cloud server, so that the coal rock interface recognition model is trained based on the sample multi-modal data and the sample coal-rock distribution in the cloud server, to obtain a trained coal rock interface recognition model.

Based on this, in embodiments of the disclosure, after the edge processor obtains multi-modal data and a coal rock distribution acquired in real time by measurement devices such as the Hall high-current sensor, the pressure sensor, the vibration sensor, the sound sensor, the camera, the tilt sensor and the position encoder, the edge processor may pre-process the multi-modal data. For example, an image in video data for drum cutting from the camera is enhanced and denoised using a Retinex image enhancement algorithm.

In an example embodiment, memory cutting parameters and a memory cutting template are pre-stored in the edge processor. The memory cutting parameters are drum heights and traction speeds when the shearer is cutting at different positions of the working surface. The memory cutting template is a roof-to-floor curve of the working surface.

The shearer may cut a coal seam autonomously based on the memory cutting parameters and the memory cutting template set by the memory cutting function. In this case, the multi-modal data and the coal rock distribution may be acquired in real time by the measurement devices such as the Hall high-current sensor, the pressure sensor, the vibration sensor, the sound sensor, the camera, the tilt sensor and the position encoder.

When the shearer cuts the coal seam based on the memory cutting parameters and the memory cutting template set by the memory cutting function, the shearer may control a drum height and a traction speed during shearer cutting based on manual intervention. For example, the drum height and the traction speed are adjusted, by manually remote controlling and adjusting an electro-hydraulic controller and a frequency converter.

It may be understood that, when the shearer cuts the coal seam autonomously based on the memory cutting parameters and the memory cutting template set by the memory cutting function, if the coal seam is cut autonomously by the shearer based on the memory cutting parameters and the memory cutting template, and the traction speed of the shearer is normal, it may be determined that the working condition is normal and there is no need for manual intervention. When the shearer cuts the coal seam autonomously based on the memory cutting parameters and the memory cutting template, it is found that the roof or floor is cut by the shearer, or the traction speed of the shearer is abnormal. In this case, manual intervention may be performed, the electro-hydraulic controller and the frequency converter may be adjusted, and the drum height and the traction speed may be adjusted, so that the shearer may cut the coal seam normally.

Based on this, the multi-modal data and the coal rock distribution measured in real time are acquired on the basis of the memory cutting parameters and the memory cutting template in combination with the manual intervention, which may ensure that the acquired multi-modal data and the coal rock distribution are data in a normal working condition.

Further, the edge processor determines the sample multi-modal data and the sample coal rock distribution based on the multi-modal data and the coal rock distribution acquired in real time. The multi-modal data and the coal rock distribution acquired in real time may be directly determined as the sample multi-modal data and the sample coal rock distribution, or the multi-modal data and the coal rock distribution acquired in real time may be pre-processed to obtain the sample multi-modal data and the sample coal rock distribution.

Thus, in embodiments the disclosure, the edge processor sends the sample multi-modal data and the sample coal rock distribution to the cloud server. The coal rock interface recognition model is trained based on the sample multi-modal data and the sample coal-rock distribution in the cloud serve, so that when the accuracy of the sample training data is high, a coal rock interface recognition model that satisfies the working condition may be acquired, and a more accurate prediction result may be obtained during a subsequent prediction using the coal rock interface recognition model.

It needs to be noted that, in embodiments of the disclosure, the sample multi-modal data may further include other data in addition to the above examples. For example, the sample multi-modal data may further include: cutting state information and early warning information related to the shearer, a power of a scraper conveyor, an inclination length of a caving roof coal mining face, an average thickness of an initial coal seam, an inclination angle of the initial coal seam, an average gangue rate of the initial coal seam, a coal-mineable index and a gas concentration of the initial coal seam, etc.

A 3D simulation modeling may be performed using a digital twin method, to obtain the cutting state information and the early warning information related to the shearer.

In embodiments of the disclosure, the edge processor sends the sample coal rock distribution and the sample multi-modal data to the cloud server. The edge processor may send the sample coal rock distribution and the sample multi-modal data to the cloud server via a 5G network layer. The 5G network is characterized by a low latency, a large bandwidth and flexible slicing. By sending the sample coal rock distribution and the sample multi-modal data to the cloud server via the 5G network layer, data interaction between the edge processor and the cloud server may be achieved, and data upload of the edge processor and algorithm issuing of the cloud server may be completed, and a delay is small.

The configuration of the 5G network layer may refer to related descriptions in the above embodiments, which will not be repeated here.

It needs to be noted that, in embodiments of the disclosure, the edge processor may acquire in real time the sample current data of the cutting motor, the sample pressure data of the lift cylinder, the sample vibration data of the cutting arm, the sample noise data during the cutting coal rocks and the sample video data for drum cutting and send in real time these sample data to the cloud server.

At S2, a sample load state feature is acquired based on the sample vibration data and the sample noise data.

In embodiments of the disclosure, the cloud server may acquire the sample load state feature based on the sample vibration data and the sample noise data after receiving the sample vibration data and the sample noise data from the edge processor.

A GSV model is called that combines a gaussian mixture model improved by a pre-trained GMM-UBM (i.e., Gaussian Mixture Model-Universal Background Model) with a Support Vector Machine (SVM) model, and a sound feature is acquired based on the sample noise data. A pre-trained neural network model is called, and a vibration feature is acquired based on the sample vibration data. The sound feature and the vibration feature are fused to generate the sample load state feature. Therefore, the sample load state feature may be acquired based on the sample vibration data and the sample noise data.

At S3, a sample cutting feature of a coal rock interface is acquired based on the sample video data.

In embodiments of the disclosure, the cloud server may acquire the sample cutting feature of the coal rock interface based on the sample video data after receiving sample video data for drum cutting from the edge processor.

A pre-trained deep adversarial learning network algorithm model is called, and the sample cutting feature of the coal rock interface is acquired based on the sample video data.

At S4, a sample load feature for drum cutting is acquired based on the sample current data and the sample pressure data.

In embodiments of the disclosure, the cloud server may acquire the sample load feature for drum cutting based on the sample current data and the sample pressure data after receiving the sample current data and the sample pressure data from the edge processor.

A pre-trained load feature model based on a Bayesian network model is called to determine a relationship between a current change and cutting of the coal rocks based on the sample current data. A pre-trained cylinder pressure model based on a principle of an equivalent average load is called, so that a height position of the rock layer relative to the drum is determined based on the sample pressure data.

At S5, the coal rock interface recognition model is called, and a decision-level fusion is performed based on the sample load state feature, the sample cutting feature of the coal rock interface and the sample load feature for drum cutting to generate a sample predicted coal rock distribution.

In embodiments of the disclosure, a collaborative representation is adopted, to respectively map each of the multiple modes to its respective representation space based on a similarity model. The sample load state feature, the sample cutting feature and the sample load feature are obtained. Then, the coal rock interface recognition model is called, which is based on a generative adverbial network model, and the decision-level fusion is performed based on the sample load state feature, the sample cutting feature and the sample load feature, to generate a sample predicted coal rock distribution.

Whether to cut the rock layer is predicted based on a current-load feature model of the cutting motor, a relative position of the rock layer is predicted by a two-cavity pressure cylinder pressure model of a heightening hydraulic cylinder of a drum, and the decision-level fusion is performed by monitoring differences among vibrations, noises and videos under cutting different occurrence conditions for the coal rocks, to generate a sample predicted coal rock distribution.

At S6, a model training update is performed on the coal rock interface recognition model based on the sample predicted coal rock distribution and the sample coal rock distribution to obtain a trained coal rock interface recognition model.

In embodiments of the disclosure, the cloud server performs the model training update on the coal rock interface recognition model based on the sample predicted coal rock distribution and the sample coal rock distribution. The sample predicted coal rock distribution is obtained by prediction based on the sample multi-modal data.

The process of performing the model training update on the coal rock interface recognition model based on the sample predicted coal rock distribution and the sample coal rock distribution may include: performing a model parameter update on the coal rock interface recognition model based on a calculation loss between the sample predicted coal rock distribution and the sample coal rock distribution. When the calculation loss is less than a certain value, it indicates that the recognition accuracy of the coal-rock interface recognition model is high and stable, thereby obtaining the trained coal rock interface recognition model.

For ease of understanding, one example embodiment is provided in embodiments of the disclosure.

Figure 4:
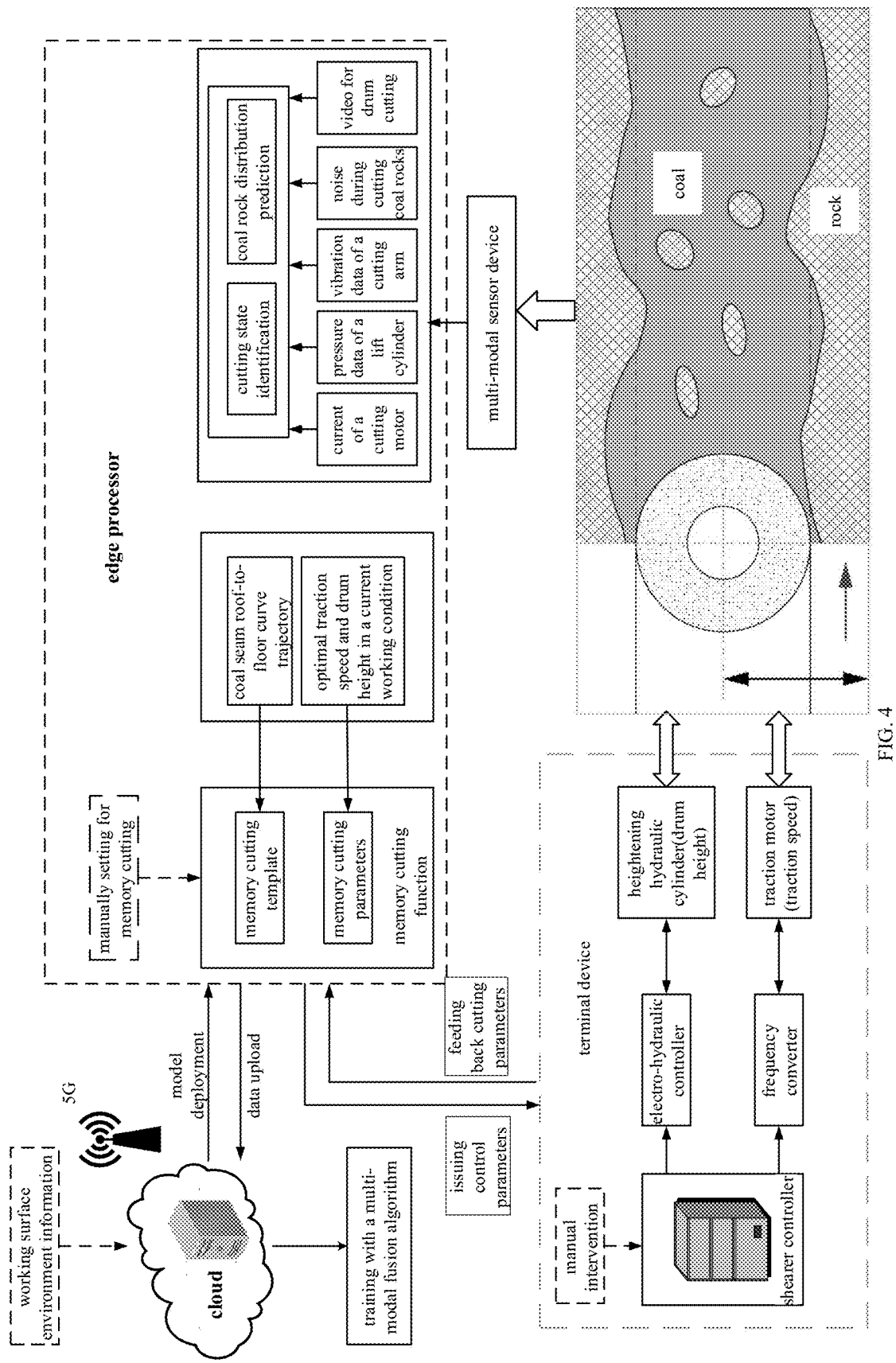
FIG. 4 is a structural diagram illustrating an intelligent control system for a shearer according to an embodiment of the present disclosure.

As illustrated in FIG. 4, the edge processor acquires real-time multi-modal data sent by a multi-modal sensor device. For example, the current data of the cutting motor is acquired by the Hall high-current sensor, the pressure data of the lift cylinder is acquired by the pressure sensor, the vibration data of the cutting arm is acquired by the vibration sensor, the noise data during cutting coal rocks is acquired by the sound sensor, the video data for drum cutting is acquired by the camera, a drum height is acquired by the tilt sensor, and a position and a traction speed of the shearer on the working surface are acquired by the position encoder.

The edge processor may pre-process the multi-modal data acquired in real time. The pre-processing may be obtaining sample multi-modal data and a sample coal rock distribution in combination with manual intervention, the memory cutting parameters and the memory cutting template, performing a data upload and sending the data to the cloud server via the 5G network layer.

The server processor receives the sample coal rock distribution and the sample multi-modal data from the edge processor. The sample multi-modal data includes: the sample current data of the cutting motor, the sample pressure data of the lift cylinder, the sample vibration data of the cutting arm, the sample noise data during the cutting coal rocks and the sample video data for drum cutting.

Then, the sample load state feature is acquired based on the sample vibration data and the sample noise data. The sample cutting feature of the coal rock interface is acquired based on the sample video data. The sample load feature for drum cutting is acquired based on the sample current data and the sample pressure data. The coal rock interface recognition model is called, and the decision-level fusion is performed based on the sample load state feature, the sample cutting feature of the coal rock interface and the sample load feature for drum cutting to generate the sample predicted coal rock distribution; and the model training update is performed on the coal rock interface recognition model based on the sample predicted coal rock distribution and the sample coal rock distribution to obtain the trained coal rock interface recognition model.

When the trained coal rock interface recognition model is obtained, the cloud server may perform a model deployment, and send the trained coal rock interface recognition model to the edge processor via the 5G network layer.

The edge processor may predict a coal rock distribution based on the multi-modal data acquired in real time using the trained coal rock interface recognition model, and also calibrate the memory cutting template and the memory cutting parameters to obtain a drum height and a traction speed when the shearer performs coal cutting. Further, the edge processor may send the drum height and the traction speed to a coal controller, so that the shearer is controlled to cut a coal seam based on the drum height and the traction speed. Therefore, the application based on the 5G industrial Internet and the cloud edge fusion may greatly enhance the training efficiency and the accuracy of the coal rock interface recognition model, and improve the stability of intelligent cutting control.

In embodiments of the disclosure, the coal rock interface recognition model is trained using closed-loop iteration and loop convergence, and efficient model training, deployment and control is thus achieved based on a cloud-edge collaboration technology in combination with manual intervention to the control parameters, and optimal control parameters are extracted by adapting to a cutting state, to correct the memory cutting parameters and the memory cutting template.

By implementing the embodiments of the disclosure, the sample coal rock distribution and the sample multi-modal data are received from the edge processor. The sample multi-modal data includes: the sample current data of the cutting motor, the sample pressure data of the lift cylinder, the sample vibration data of the cutting arm, the sample noise data during the cutting coal rocks and the sample video data for drum cutting. The sample load state feature is acquired based on the sample vibration data and the sample noise data. The sample cutting feature of the coal rock interface is acquired based on the sample video data. The sample load feature for drum cutting is acquired based on the sample current data and the sample pressure data. The coal rock interface recognition model is called, and the decision-level fusion is performed based on the sample load state feature, the sample cutting feature of the coal rock interface and the sample load feature for drum cutting to generate the sample predicted coal rock distribution; and the model training update is performed on the coal rock interface recognition model based on the sample predicted coal rock distribution and the sample coal rock distribution to obtain the trained coal rock interface recognition model. Therefore, the coal rock interface recognition model may be trained online in real time based on multi-modal data in combination with a real-time working condition, which may improve the training efficiency and the accuracy of the coal rock interface recognition model.

Figure 5:
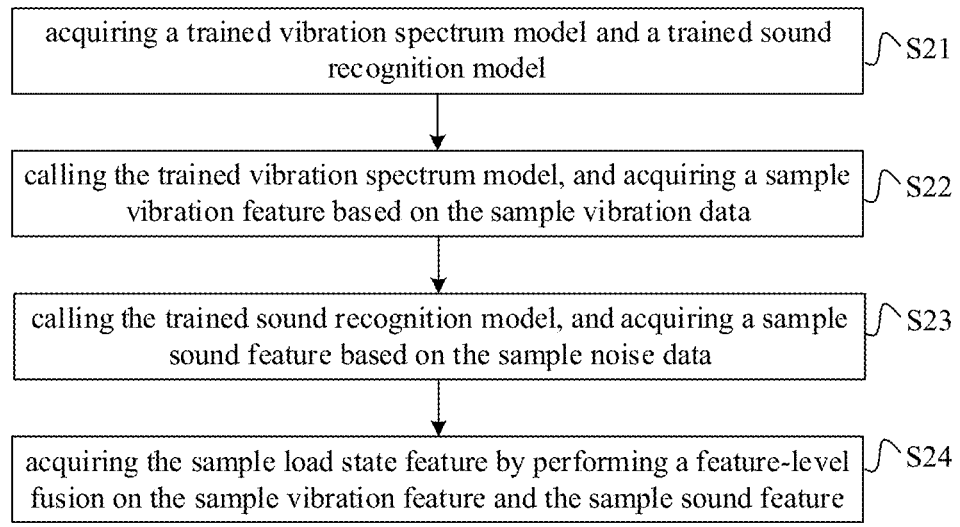
FIG. 5 is a flowchart illustrating S2 in the method for training a coal rock interface recognition model according to an embodiment of the present disclosure.

As illustrated in FIG. 5, in some embodiments, at S2, acquiring the sample load state feature based on the sample vibration data and the sample noise data includes the following steps.

At S21, a trained vibration spectrum model and a trained sound recognition model are acquired.

In embodiments of the disclosure, the trained vibration spectrum model may be a GSV model that combines a Gaussian mixture model improved by a pre-trained GMM-UBM with an SVM model; and the trained sound recognition model may be a trained neural network model.

The process of obtaining the trained vibration spectrum model may include: acquiring in advance vibration data and a vibration feature corresponding to the vibration data, obtaining a predicted vibration feature by inputting the vibration data into the vibration spectrum model, and performing a parameter update on the vibration spectrum model based on the vibration feature and the predicted vibration feature. The parameter update is performed on the vibration spectrum model based on a vibration loss calculated between the vibration feature and the predicted vibration feature, and the trained vibration spectrum model may be determined when the vibration loss satisfies a vibration optimization condition. In this way, the trained vibration spectrum model is obtained.

In embodiments of the disclosure, the method for acquiring the trained vibration spectrum model may refer to the method in the related art, and is not limited to the method according to the embodiments of the disclosure, which is not limited in the embodiments of the disclosure.

The process of obtaining the trained sound recognition model may include: acquiring audio data and an audio feature corresponding to the audio data, obtaining a predicted audio feature by inputting the audio data into the sound recognition model, and performing a parameter update on the sound recognition model based on the audio feature and the predicted audio feature. The parameter update is performed on the sound recognition model by calculating an audio loss between the audio feature and the predicted audio feature, and it may be determined that the trained audio recognition model is obtained when the audio loss satisfies an audio optimization condition. In this way, the trained sound recognition model is acquired.

In embodiments of the disclosure, the method for acquiring the trained sound recognition model may refer to the method in the related art, and is not limited to the method according to the embodiments of the disclosure, which is not limited in the embodiments of the disclosure.

At S22, the trained vibration spectrum model is called, and a sample vibration feature is acquired based on the sample vibration data.

At S23, the trained sound recognition model is called, and a sample sound feature is acquired based on the sample noise data.

In embodiments of the present disclosure, when the trained vibration spectrum model and the trained sound recognition model are acquired, the trained vibration spectrum model is called, and the sample vibration feature is acquired based on the sample vibration data. The trained sound recognition model is called, and the sample sound feature is acquired based on the sample noise data.

At S24, the sample load state feature is acquired by performing a feature-level fusion on the sample vibration feature and the sample sound feature.

In embodiments of the disclosure, when the sample vibration feature and the sample sound feature are acquired, the sample load state feature is acquired by performing the feature-level fusion on the sample vibration feature and the sample sound feature. Therefore, the sample load state feature is acquired based on the sample vibration data and the sample noise data.

Figure 6:
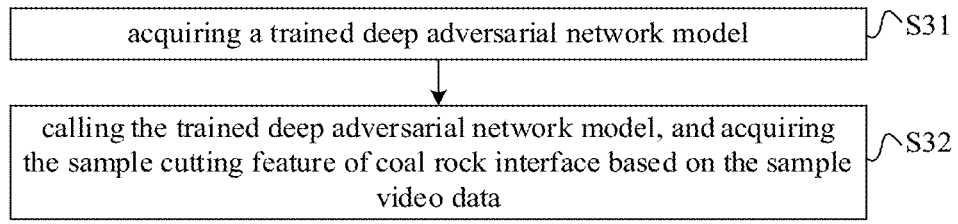
FIG. 6 is a flowchart illustrating S3 in the method for training a coal rock interface recognition model according to an embodiment of the present disclosure.

At illustrated in FIG. 6, in some embodiments, the step at S3, acquiring a sample cutting feature of a coal rock interface based on the sample video data, includes the following steps.

At S31, a trained deep adversarial network model is acquired.

The process of obtaining the trained deep adversarial network model may include: acquiring in advance video data and a cutting feature of a coal rock interface corresponding to the video data, obtaining a predicted cutting feature of the coal rock interface by inputting the video data into the deep adversarial network model, and performing a parameter update on the deep adversarial network model based on the cutting feature and the predicted cutting feature. The parameter update is performed on the deep adversarial network model by calculating a video loss between the cutting feature and the predicted cutting feature, and it may be determined that the trained deep adversarial network model is obtained when the video loss satisfies a video optimization condition. In this way, the trained deep adversarial network model is acquired.

In embodiments of the disclosure, the method for acquiring the trained deep adversarial learning network model may refer to the method in the related art, and is not limited to the method according to the embodiments of the disclosure, which is not limited in the embodiments of the disclosure.

At S32, the trained deep adversarial network model is called, and the sample cutting feature of coal rock interface is acquired based on the sample video data.

In embodiments of the disclosure, when the pre-trained deep adversarial learning network model is acquired, the trained deep adversarial learning network model is called, and the sample cutting feature of the coal rock interface is acquired based on the sample video data.

Figure 7:
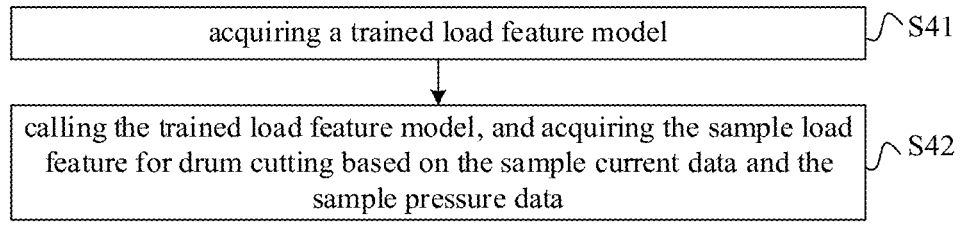
FIG. 7 is a flowchart illustrating S4 in the method for training a coal rock interface recognition model according to an embodiment of the present disclosure.

As illustrated in FIG. 7, in some embodiments, the step at S4, acquiring the sample load feature for drum cutting based on the sample current data and the sample pressure data, includes the following steps.

At S41, a trained load feature model is acquired.

In embodiments of the disclosure, the trained load feature model may be a trained Bayesian network model.

The process of acquiring the trained load feature model may include: acquiring in advance current data of the cutting motor and pressure data of the lift cylinder, and load features for drum cutting corresponding to the current data and the pressure data; inputting the current data of the cutting motor and the pressure data of the lift cylinder into a load feature model to obtain a predicted load feature; and performing a parameter update on the load feature model based on the load feature and the predicted load feature. The parameter update is performed on the load feature model by calculating a load loss between the load feature and the predicted load feature, and the trained load feature model may be determined when the load loss satisfies a vibration optimization condition. In this way, the trained load feature model is acquired.

In embodiments of the disclosure, the method for acquiring the trained load feature model may refer to the method in the related art, and is not limited to the method according to the embodiments of the disclosure, which is not limited in the embodiments of the disclosure.

At S42, the trained load feature model is called, and the sample load feature for drum cutting is acquired based on the sample current data and the sample pressure data.

In embodiments of the disclosure, when the trained load feature model is acquired, the trained load feature model is called, and the sample load feature for drum cutting is acquired based on the sample current data and the sample pressure data.

Figure 8:
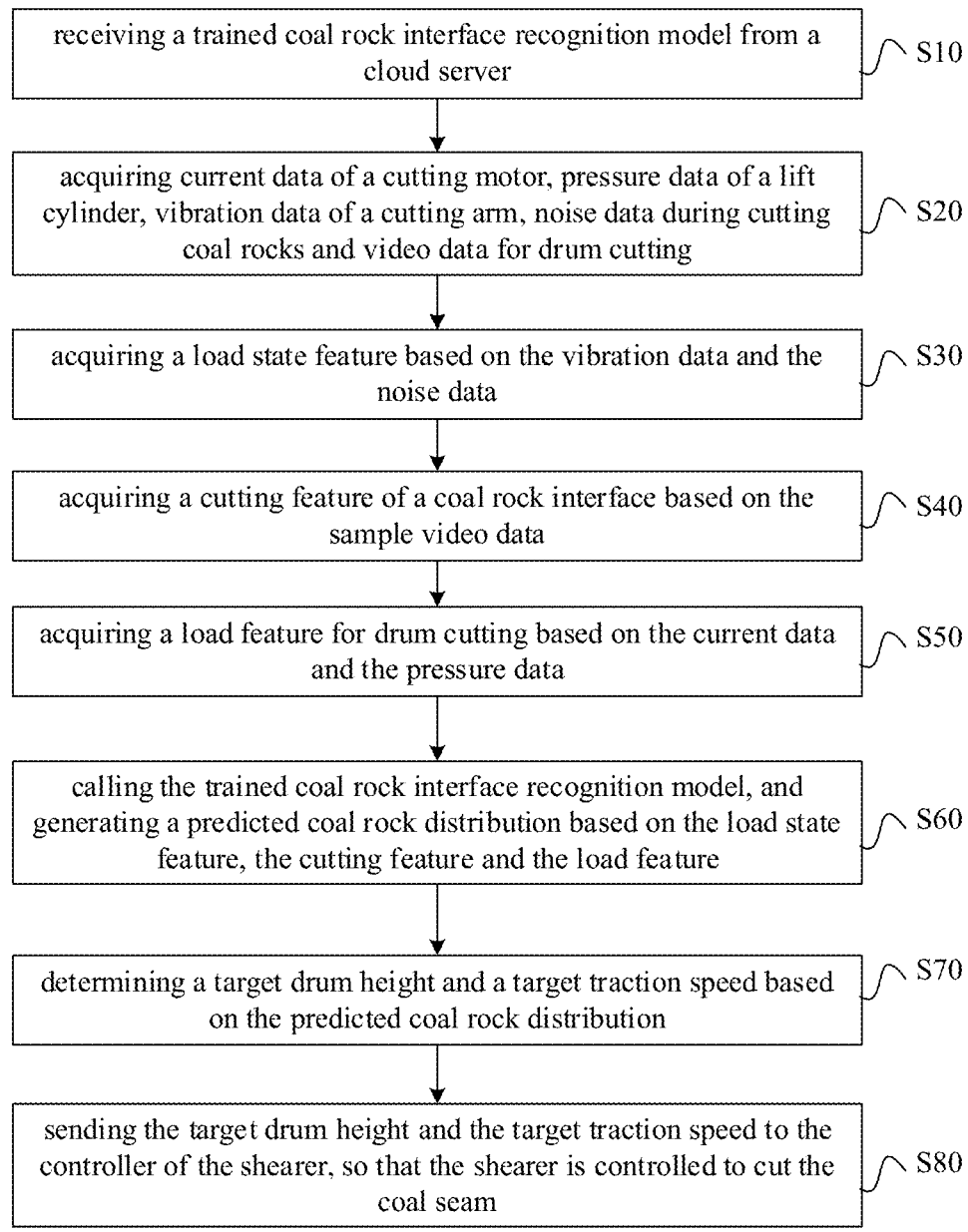
FIG. 8 is a flowchart illustrating a method for cutting control of a shearer according to an embodiment of the present disclosure.

FIG. 8 is a flowchart illustrating a method for cutting control of a shearer according to an embodiment of the present disclosure.

As illustrated in FIG. 8, the method for cutting control of a shearer according to an embodiment of the disclosure is performed by an edge processor. The method includes but not limited to the following steps.

At S10, a trained coal rock interface recognition model is received from a cloud server. The trained coal rock interface recognition model is obtained by training according to the method in the above embodiments.

In embodiments of the disclosure, the edge processor receives the trained coal rock interface recognition model from the cloud server. The edge processor may receive the trained coal rock interface recognition model from the cloud server via a 5G network layer. The 5G network is characterized by a low latency, a large bandwidth and flexible slicing. The trained coal rock interface recognition model is received from the cloud server via the 5G network layer, which may rapidly complete the model deployment for subsequent processes of shearer cutting prediction, and a control of the shearer to cut a coal seam.

The trained coal rock interface recognition model is obtained by training according to methods in the above embodiments. The methods in the above embodiments may refer to relevant descriptions of the above embodiment, which will not be repeated here.

At S20, current data of a cutting motor, pressure data of a lift cylinder, vibration data of a cutting arm, noise data during cutting coal rocks and video data for drum cutting are acquired.

In embodiments of the present disclosure, the current data of the cutting motor, the pressure data of the lift cylinder, the vibration data of the cutting arm, the noise data during cutting coal rocks and the video data for drum cutting may be acquired in real time.

Figure 9:
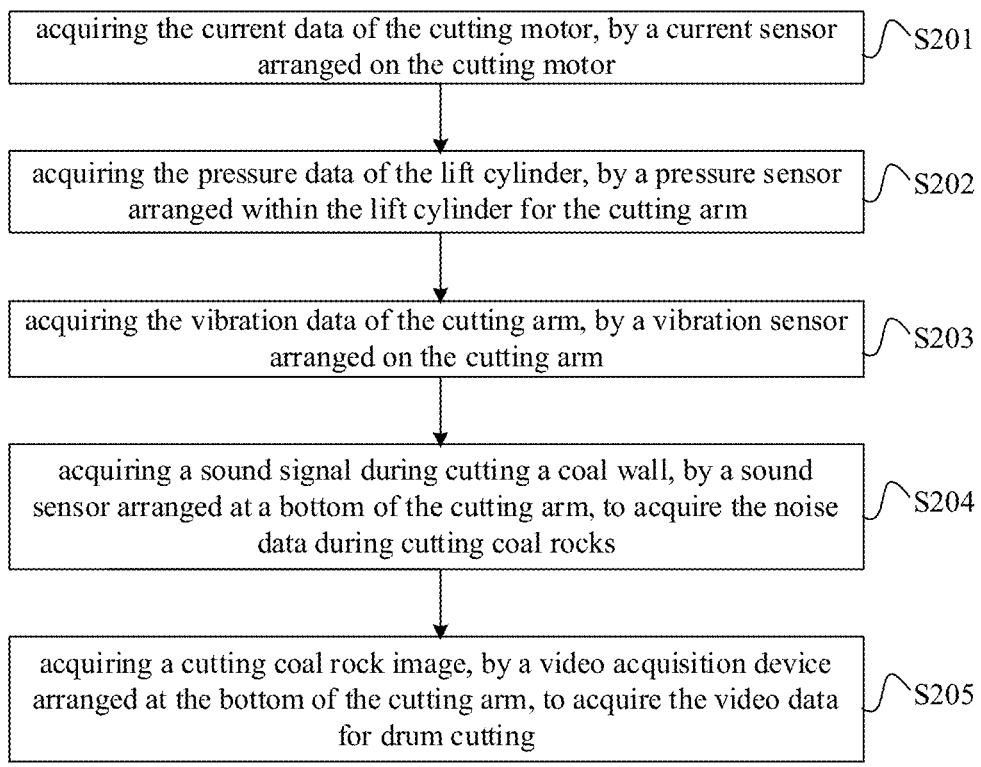
FIG. 9 is a flowchart illustrating S20 in the method for cutting control of a shearer according to an embodiment of the present disclosure.

As illustrated in FIG. 9, in some embodiments, the step at S20, acquiring current data of a cutting motor, pressure data of a lift cylinder, vibration data of a cutting arm, noise data during cutting coal rocks and video data for drum cutting, includes the following steps.

At S201, the current data of the cutting motor is acquired, by a current sensor arranged on the cutting motor.

At S202, the pressure data of the lift cylinder is acquired, by a pressure sensor arranged within the lift cylinder for the cutting arm.

At S203, the vibration data of the cutting arm is acquired, by a vibration sensor arranged on the cutting arm.

At S204, a sound signal during cutting a coal wall is acquired, by a sound sensor arranged at a bottom of the cutting arm, to acquire the noise data during cutting coal rocks.

At S205, a cutting coal rock image is acquired, by a video acquisition device arranged at the bottom of the cutting arm, to acquire the video data for drum cutting.

In embodiments of the disclosure, the current data of the cutting motor may be acquired, by the current sensor arranged on the cutting motor. The current sensor may be a Hall high-current sensor. The pressure data of the lift cylinder may be acquired, by the pressure sensor arranged within the lift cylinder for the cutting arm. The vibration data of the cutting arm may be acquired, by the vibration sensor arranged on the cutting arm. The sound signal during cutting the coal wall may be acquired, by the sound sensor arranged at the bottom of the cutting arm, to acquire the noise data during cutting coal rocks. The cutting coal rock image may be acquired, by the video acquisition device arranged at the bottom of the cutting arm, to acquire the video data for drum cutting.

It may be understood that, in embodiments of the disclosure, the multi-modal data may be acquired by the multimedia sensor device in real time, so that a real-time working condition may be acquired, the prediction result obtained in a subsequent prediction may well satisfy the requirements of the actual working condition, and the prediction accuracy may be enhanced.

In some embodiments, the method for cutting control of the shearer according to embodiments of the disclosure further includes: receiving a trained vibration spectrum model, a trained sound recognition model, a trained deep adversarial network model and a trained load feature model from the cloud server.

In embodiments of the disclosure, the edge processor receives the trained vibration spectrum model, the trained sound recognition model, the trained deep adversarial network model and the trained load feature model from the cloud server. The edge processor may receive the trained vibration spectrum model, the trained sound recognition model, the trained deep adversarial network model and the trained load feature model from the cloud server via a 5G network layer. The 5G network is characterized by a low latency, a large bandwidth and flexible slicing. The trained coal rock interface recognition model is received from the cloud server via the 5G network layer, which may rapidly complete the model deployment for subsequent processes of shearer cutting prediction, and a control of the shearer to cut the coal seam.

It may be understood that, the cloud server sends the trained vibration spectrum model, the trained sound recognition model, the trained deep adversarial network model and the trained load feature model to the edge processor, where the vibration spectrum model, the sound recognition model, the deep adversarial network model and the load feature model may complete their respective training processes in the cloud server.

At S30, a load state feature is acquired based on the vibration data and the noise data.

In embodiments of the disclosure, the trained vibration spectrum model is called, and a vibration feature is acquired based on the vibration data; the trained sound recognition model is called, and a sound feature is acquired based on the noise data; and the load state feature is acquired by performing the feature-level fusion on the vibration feature and the sound feature.

At S40, a cutting feature of a coal rock interface is acquired based on the sample video data.

In embodiments of the present disclosure, the trained deep adversarial network model is called, and the cutting feature of the coal rock interface is acquired based on the video data.

At S50, a load feature for drum cutting is acquired based on the current data and the pressure data.

In embodiments of the present disclosure, the trained load feature model is called, and the sample load feature for drum cutting is acquired based on the current data and the pressure data.

At S60, the trained coal rock interface recognition model is called, and a predicted coal rock distribution is generated based on the load state feature, the cutting feature and the load feature.

In embodiments of the present disclosure, when the load state feature, the cutting feature and the load feature are acquired, the trained coal rock interface recognition model is called, and the predicted coal rock distribution is generated based on the load state feature, the cutting feature and the load feature.

At S70, a target drum height and a target traction speed are determined based on the predicted coal rock distribution.

In embodiments of the disclosure, the target drum height and the target traction speed are determined based on the predicted coal rock distribution. It may be understood that, corresponding drum-heights and traction speeds are different under different predicted coal rock distributions. The target drum height and target traction speed are determined based on a Depth Deterministic Policy Gradient (DDPG) algorithm and an adaptive cutting control policy.

The DDPG algorithm and the adaptive cutting control policy may be preset and set as needed, or may be pre-trained or formulated, which are not limited in the embodiments of the present disclosure.

In embodiments of the disclosure, the edge processor may determine a target roof-to-floor cutting curve based on the predicted coal rock distribution.

At S80, the target drum height and the target traction speed are sent to the controller of the shearer, so that the shearer is controlled to cut the coal seam.

In embodiments of the disclosure, the target drum height and the target traction speed are acquired and sent to the shearer controller, so that the shearer is controlled to cut the coal seam. Thus, the coal rock distribution of the shearer may be predicted, and intelligent cutting control may be performed on the shearer based on the prediction result, which satisfies a real-time working condition, with high accuracy.

In some embodiments of the disclosure, the method for cutting control of the shearer according to embodiments of the disclosure further includes: acquiring and sending the sample coal rock distribution and the sample multi-modal data to the cloud server, to acquire the trained coal rock interface recognition model. The sample multi-modal data includes: the sample current data of the cutting motor, the sample pressure data of the lift cylinder, the sample vibration data of the cutting arm, the sample noise data during cutting the coal rocks and the sample video data for drum cutting.

In embodiments of the disclosure, the edge processor further acquires and sends the sample coal rock distribution and the sample multi-modal data to the cloud server, so that the cloud server performs model training to acquire the trained coal rock interface recognition model.

In embodiments of the disclosure, the coal rock distribution may be the drum height, and the position and the traction speed of the shearer on the working surface, or a coal rock distribution position and a coal rock distribution ratio that are determined based on the drum height, and the position and the traction speed of the shearer on the working surface.

In order to acquire the sample coal rock distribution, the drum height may be acquired by a tilt sensor, and the position and the traction speed of the shearer on the working surface may be acquired by a position encoder, further to determine the sample coal rock distribution.

The method for acquiring the sample multi-modal data may may refer to related descriptions in the above embodiments, which will not be repeated here.

Figure 10:
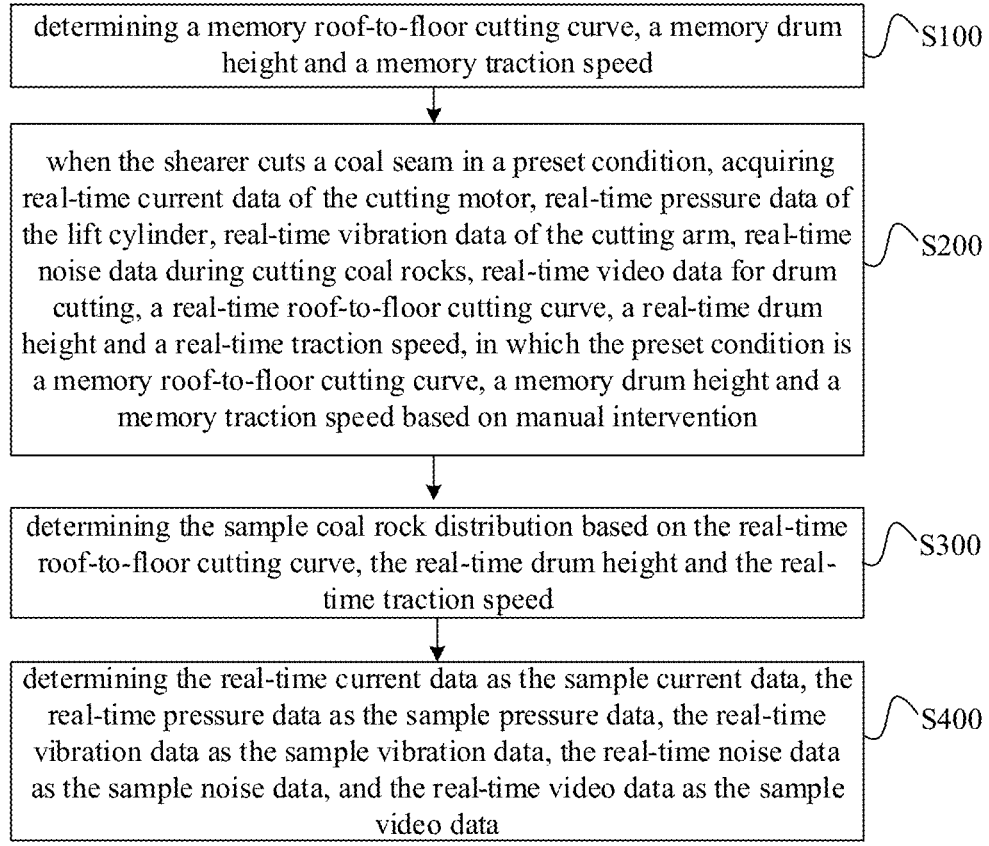
FIG. 10 is a flowchart illustrating another method for cutting control of a shearer according to an embodiment of the present disclosure.

As illustrated in FIG. 10, in some embodiments, acquiring the sample coal rock distribution and the sample multi-modal data includes the following steps.

At S100, a memory roof-to-floor cutting curve, a memory drum height and a memory traction speed are determined.

In embodiments of the disclosure, the memory roof-to-floor cutting curve, the memory drum height and the memory traction speed may be stored in the edge processor. The memory roof-to-floor cutting curve, the memory drum height and the memory traction speed may be acquired by the method in the related art, and pre-stored in the edge processor.

At S200, when the shearer during cuts a coal seam in a preset condition, real-time current data of the cutting motor, real-time pressure data of the lift cylinder, real-time vibration data of the cutting arm, real-time noise data during cutting coal rocks, real-time video data for drum cutting, a real-time roof-to-floor cutting curve, a real-time drum height and a real-time traction speed are acquired. The preset condition is a memory roof-to-floor cutting curve, a memory drum height and a memory traction speed based on manual intervention.

In embodiments of the disclosure, the shearer may cut a coal seam autonomously based on the memory roof-to-floor cutting curve, the memory drum height and the memory traction speed set by the memory cutting function. In this case, multi-modal data and a coal rock distribution may be acquired in real time by measurement devices such as a Hall high-current sensor, a pressure sensor, a vibration sensor, a sound sensor, a camera, a tilt sensor and a position encoder.

When the shearer cuts the coal seam based on the memory cutting parameters and the memory cutting template set by the memory cutting function, the drum height and the traction speed when the shearer cuts the coal seam may be controlled based on manual intervention. For example, the drum height and the traction speed are adjusted, by manually remote controlling and adjusting an electro-hydraulic controller and a frequency converter.

It may be understood that, when the shearer cuts the coal seam based on the memory cutting parameters and the memory cutting template set by the memory cutting function, if the coal seam is cut autonomously by the shearer based on the memory cutting parameters and the memory cutting template, and the traction speed of the shearer is normal, it may be determined that the working condition is normal and there is no need for manual intervention. When the shearer cuts the coal seam autonomously based on the memory cutting parameters and the memory cutting template, it is found that the roof or floor is cut by the shearer, or the traction speed of the shearer is abnormal. In this case, manual intervention may be performed, the electro-hydraulic controller and frequency converter may be adjusted, the drum height and the traction speed may be adjusted, so that the shearer may cut the coal seam normally.

Based on this, the multi-modal data and the coal rock distribution measured in real time are acquired on the basis of the memory cutting parameters and the memory cutting template in combination with the manual intervention, which may ensure that the acquired multi-modal data and the coal rock distribution are data in a normal working condition.

At S300, the sample coal rock distribution is determined based on the real-time roof-to-floor cutting curve, the real-time drum height and the real-time traction speed.

In embodiments of the disclosure, the sample coal rock distribution is determined based on the real-time roof-to-floor cutting curve, the real-time drum height and the real-time traction speed.

It may be understood that, corresponding drum heights and traction speeds are different under different predicted coal rock distributions. The sample coal rock distribution may be determined based on the real-time roof-to-floor cutting curve, the real-time drum height and the real-time traction speed.

At S400, the real-time current data is determined as the sample current data, the real-time pressure data is determined as the sample pressure data, the real-time vibration data is determined as the sample vibration data, the real-time noise data is determined as the sample noise data, and the real-time video data is determined as the sample video data.

In embodiments of the disclosure, the edge processor determines the sample multi-modal data and the sample coal rock distribution based on the multi-modal data acquired in real time and the coal rock distribution acquired in real time. The multi-modal data acquired in real time and the coal rock distribution acquired in real time may be directly determined as the sample multi-modal data and the sample coal rock distribution, or the sample multi-modal data and the sample coal rock distribution may be obtained after the multi-modal data acquired in real time and the coal rock distribution acquired in real time are pre-processed.

The edge processor sends the sample multi-modal data and the sample coal rock distribution to the cloud server, so that the cloud server trains the coal rock interface recognition model based on the sample multi-modal data and the sample coal-rock distribution. When the accuracy of the sample training data is high, a coal rock interface recognition model that satisfies the working condition may be acquired, and a more accurate prediction result may be obtained during a subsequent prediction using the coal rock interface recognition model.

Figure 11:
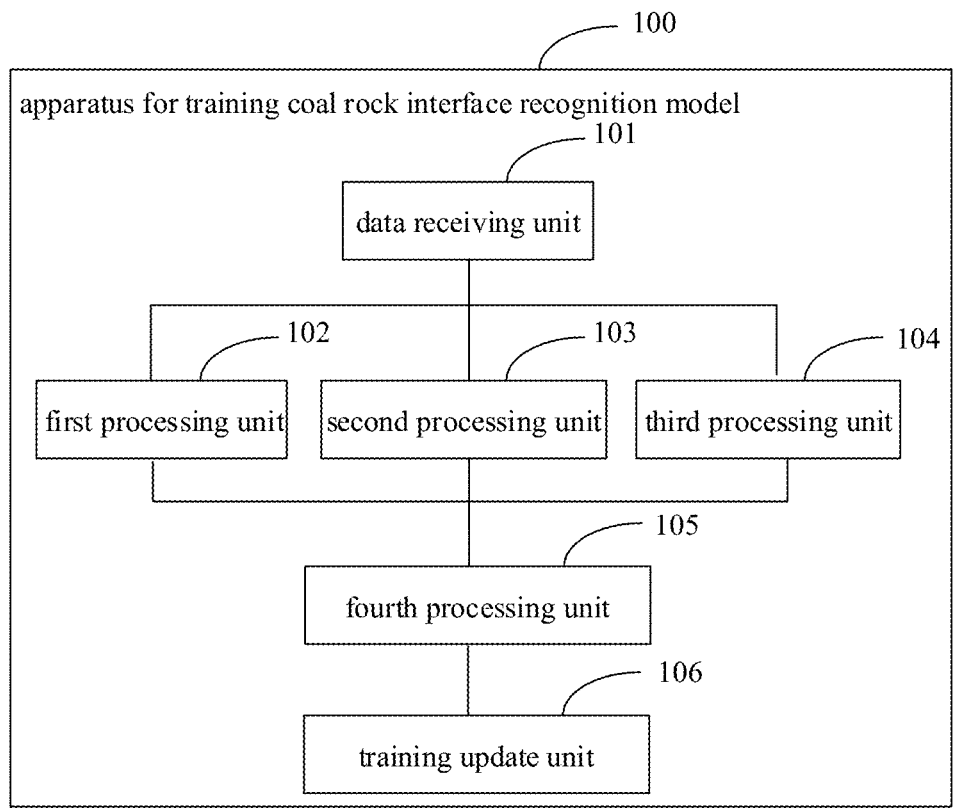
FIG. 11 is a structural diagram illustrating an apparatus for training a coal rock interface recognition model according to an embodiment of the present disclosure.

FIG. 11 is a structural diagram illustrating an apparatus for training a coal rock interface recognition model according to an embodiment of the present disclosure.

As illustrated in FIG. 11, an apparatus 100 for training a coal rock interface recognition model includes a data receiving unit 101, a first processing unit 102, a second processing unit 103, a third processing unit 104, a fourth processing unit 105 and a training update unit 106.

The data receiving unit 101 is configured to receive a sample coal rock distribution and sample multi-modal data from an edge processor. The sample multi-modal data includes: sample current data of a cutting motor, sample pressure data of a lift cylinder, sample vibration data of a cutting arm, sample noise data during cutting coal rocks and sample video data for drum cutting.

The first processing unit 102 is configured to acquire a sample load state feature based on vibration data and sample noise data.

The second processing unit 103 is configured to acquire a sample cutting feature of a coal rock interface based on the sample video data.

The third processing unit 104 is configured to acquire a sample load feature for drum cutting based on the sample current data and the sample pressure data.

The fourth processing unit 105 is configured to call the coal rock interface recognition model, and perform a decision-level fusion based on the sample load state feature, the sample cutting feature and the sample load feature to generate a sample predicted coal rock distribution.

The training update unit 106 is configured to perform a model training update on the coal rock interface recognition model based on the sample predicted coal rock distribution and the sample coal rock distribution to obtain a trained coal rock interface recognition model.

Figure 12:
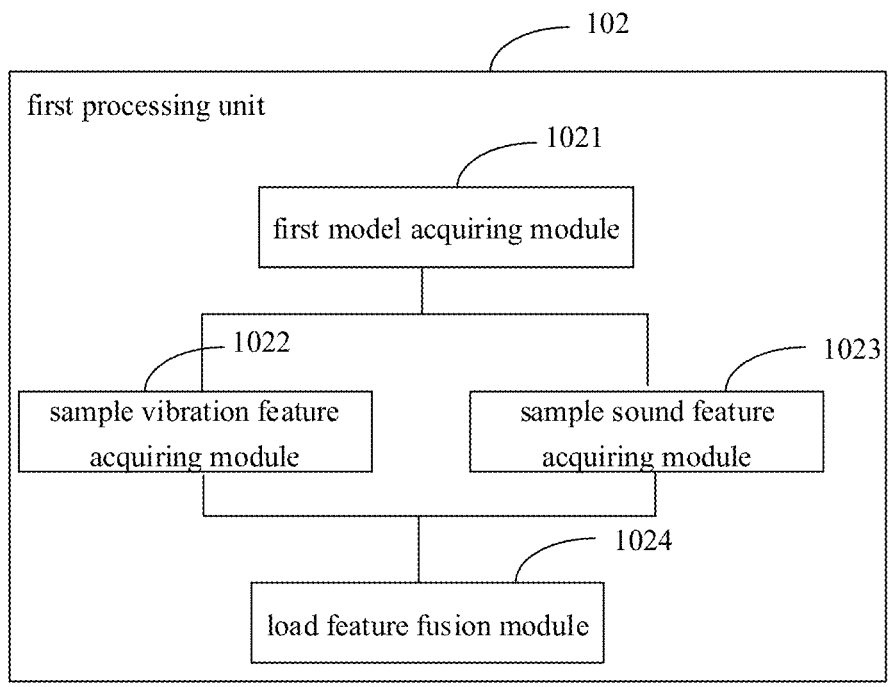
FIG. 12 is a structural diagram illustrating a first processing unit in the apparatus for training a coal rock interface recognition model according to an embodiment of the present disclosure.

As illustrated in FIG. 12, in some embodiments, the first processing unit 102 includes a first model acquiring module 1021, a sample vibration feature acquiring module 1022, a sample sound feature acquiring module 1023 and a load feature fusion module 1024.

The first model acquiring module 1021 is configured to acquire a trained vibration spectrum model and a trained sound recognition model.

The sample vibration feature acquiring module 1022 is configured to call the trained vibration spectrum model, and acquire a sample vibration feature based on the sample vibration data.

The sample sound feature acquiring module 1023 is configured to call the trained sound recognition model, and acquire a sample sound feature based on the sample noise data.

The load feature fusion module 1024 is configured to acquire the sample load state feature by performing a feature-level fusion on the sample vibration feature and the sample sound feature.

Figure 13:
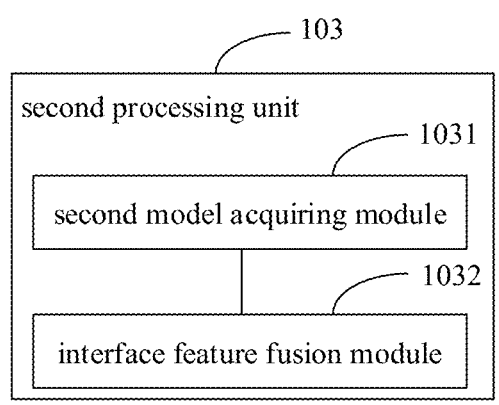
FIG. 13 is a structural diagram illustrating a second processing unit in the apparatus for training a coal rock interface recognition model according to an embodiment of the present disclosure.

As illustrated in FIG. 13, in some embodiments, the second processing unit 103 includes a second model acquiring module 1031 and an interface feature fusion module 1032.

The second model acquiring module 1031 is configured to acquire a trained deep adversarial network model.

The interface feature fusion module 1032 is configured to call the trained deep adversarial network model, and acquire the sample cutting feature of the coal rock interface based on the sample video data.

Figure 14:
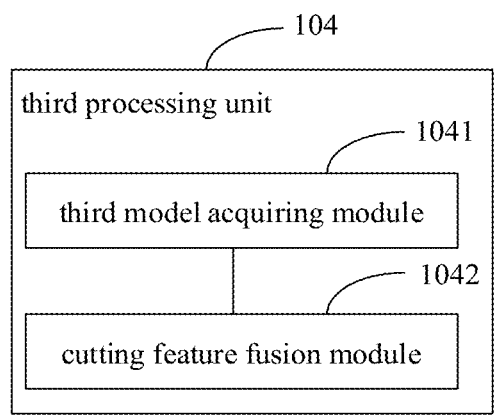
FIG. 14 is a structural diagram illustrating a third processing unit in the apparatus for training a coal rock interface recognition model according to an embodiment of the present disclosure.

As illustrated in FIG. 14, in some embodiments, the third processing unit 104 includes a third model acquiring module 1041 and a cutting feature fusion module 1042.

The third model acquiring module 1041 is configured to acquire a trained load feature model.

The cutting feature fusion module 1042 is configured to call the trained load feature model, and acquire the sample load feature for drum cutting based on the sample current data and the sample pressure data.

With regards to the apparatus in the above embodiments, the specific way in which each module performs the operation has been described in embodiments of the method and will not be elaborated here.

The beneficial effect obtained by the apparatus for training the coal rock interface recognition model in embodiments of the disclosure is same as the beneficial effect obtained by the method for training the coal rock interface recognition model in embodiments of the disclosure, which will not be repeated here.

Figure 15:
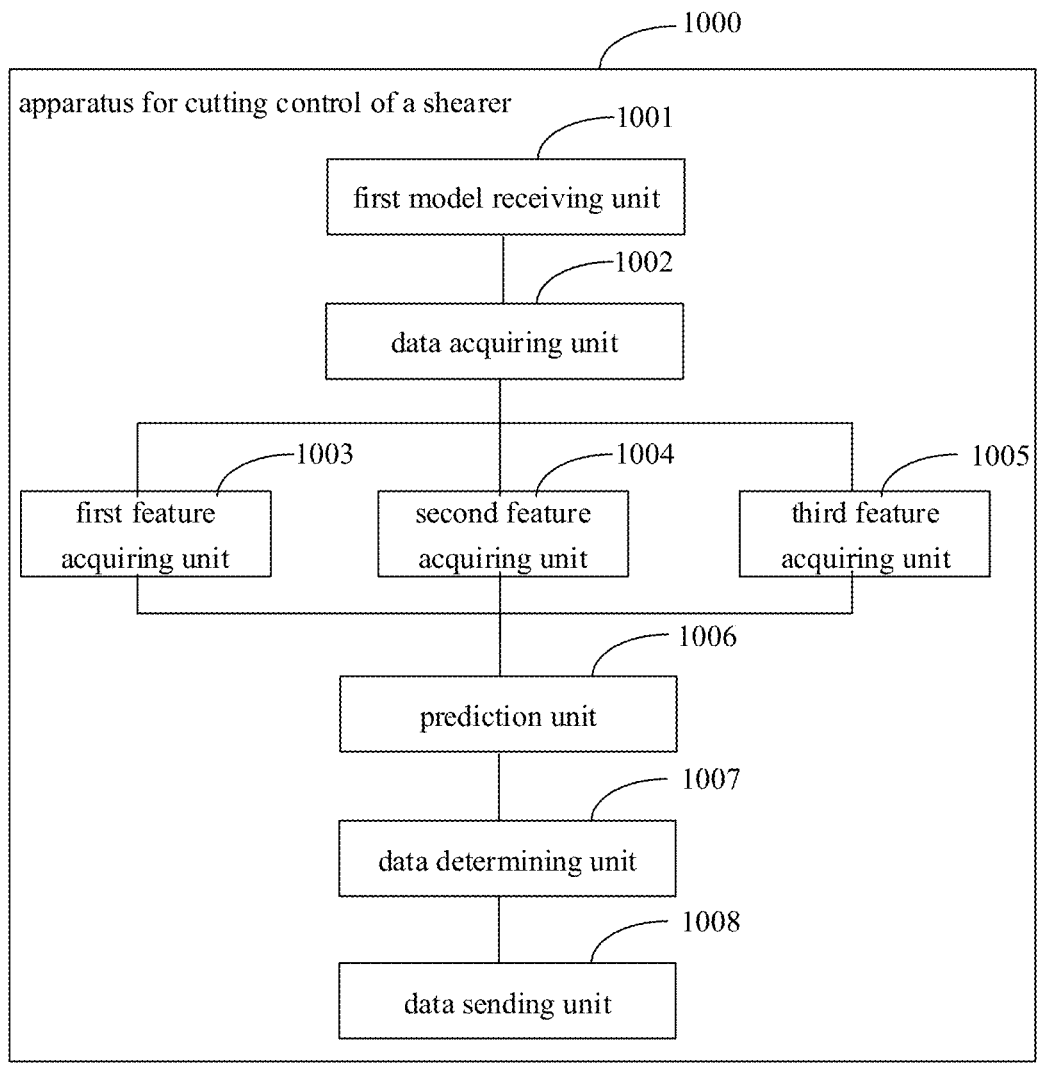
FIG. 15 is a structural diagram illustrating an apparatus for cutting control of a shearer according to an embodiment of the present disclosure.

FIG. 15 is a structural diagram illustrating an apparatus for cutting control of a shearer according to an embodiment of the present disclosure.

As illustrated in FIG. 15, an apparatus 1000 for cutting control of a shearer includes a first model receiving unit 1001, a data acquiring unit 1002, a first feature acquiring unit 1003, a second feature acquiring unit 1004, a third feature acquiring unit 1005, a prediction unit 1006, a data determining unit 1007 and a data sending unit 1008.

The first model receiving unit 1001 is configured to receive a trained coal rock interface recognition model from a cloud server. The trained coal rock interface recognition model is obtained by the method as shown in FIG. 5 to FIG. 7.

The data acquiring unit 1002 is configured to acquire current data of a cutting motor, pressure data of a lift cylinder, vibration data of a cutting arm, noise data during cutting coal rocks and video data for drum cutting.

The first feature acquiring unit 1003 is configured to acquire a load state feature based on the vibration data and the noise data.

The second feature acquiring unit 1004 is configured to acquire a cutting feature of a coal rock interface based on the video data.

The third feature acquiring unit 1005 is configured to acquire a load feature for drum cutting based on the current data and the pressure data.

The prediction unit 1006 is configured to call the trained coal rock interface recognition model, and generate a predicted coal rock distribution based on the load state feature, the cutting feature and the load feature.

The data determining unit 1007 is configured to determine a target drum height and a target traction speed based on the predicted coal rock distribution.

The data sending unit 1008 is configured to send the target drum height and the target traction speed to a controller of the shearer, so that the shearer is controlled to cut the coal seam.

Figure 16:
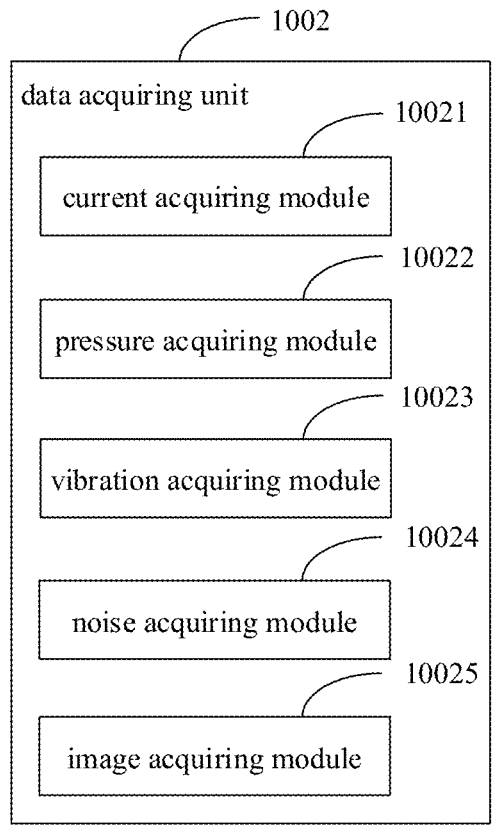
FIG. 16 is a structural diagram illustrating a data acquiring unit in the apparatus for cutting control of a shearer according to an embodiment of the present disclosure.

As illustrated in FIG. 16, in some embodiments, a data acquiring unit 1002 includes a current acquiring module 10021, a pressure acquiring module 10022, a vibration acquiring module 10023, a noise acquiring module 10024 and an image acquiring module 10025.

The current acquiring module 10021 is configured to acquire, by a current sensor arranged on the cutting motor, the current data of the cutting motor.

The pressure acquiring module 10022 is configured to acquire, by a pressure sensor arranged within the lift cylinder for the cutting arm, the pressure data of the lift cylinder.

The vibration acquiring module 10023 is configured to acquire, by a vibration sensor arranged on the cutting arm, the vibration data of the cutting arm.

The noise acquiring module 10024 is configured to acquire, by a sound sensor arranged at a bottom of the cutting arm, a sound signal during cutting a coal wall, to acquire the noise data during cutting the coal rocks.

The image acquiring module 10025 is configured to acquire, by a video acquisition device arranged at the bottom of the cutting arm, a cutting coal rock image, to acquire the video data for drum cutting.

Figure 17:
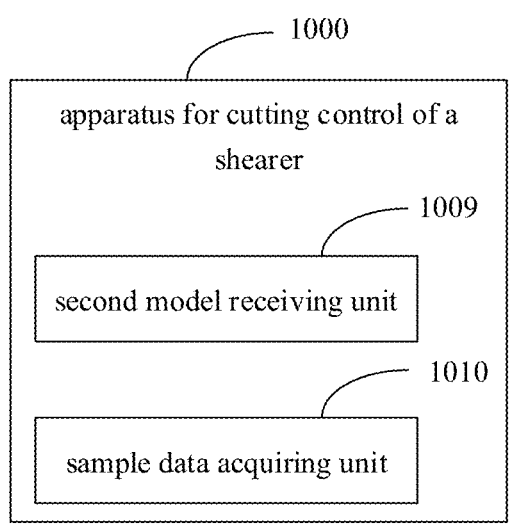
FIG. 17 is a structural diagram illustrating another apparatus for cutting control of a shearer according to an embodiment of the present disclosure.

As illustrated in FIG. 17, in some embodiments, the apparatus 1000 for cutting control of the shearer further includes a second model receiving unit 1009.

The second model receiving unit 1009 is configured to receive a trained vibration spectrum model, a trained sound recognition model, a trained deep adversarial network model and a trained load feature model from the cloud server.

As illustrated in FIG. 17, in some embodiments, the apparatus 1000 for cutting control of the shearer further includes a sample data acquiring unit 1010.

The sample data acquiring unit 1010 is configured to acquire and send the sample coal rock distribution and the sample multi-modal data to the cloud server, to acquire the trained coal rock interface recognition model. The sample multi-modal data includes: the sample current data of the cutting motor, the sample pressure data of the lift cylinder, the sample vibration data of the cutting arm, the sample noise data during the cutting coal rocks and the sample video data for drum cutting.

Figure 18:
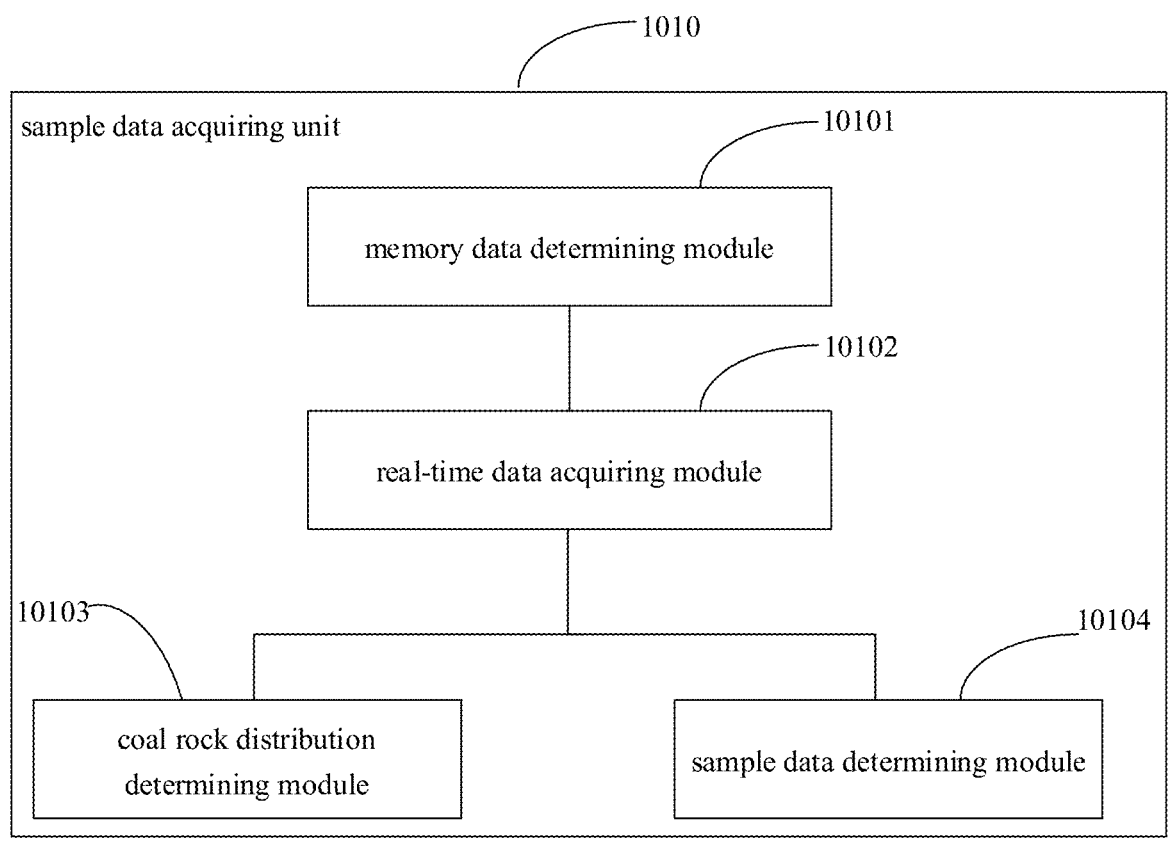
FIG. 18 is a structural diagram illustrating a sample data acquiring unit in the apparatus for cutting control of a shearer according to an embodiment of the present disclosure.

As illustrated in FIG. 18, in some embodiments, the sample data acquiring unit 1010 includes a memory data determining module 10101, a real-time data acquiring module 10102, a coal rock distribution determining module 10103 and a sample data determining module 10104.

The memory data determining module 10101 is configured to determine a memory roof-to-floor cutting curve, a memory drum height and a memory traction speed.

The real-time data acquiring module 10102 is configured to, when the shearer cuts a coal seam in a preset condition, acquire real-time current data of the cutting motor, real-time pressure data of the lift cylinder, real-time vibration data of the cutting arm, real-time noise data during cutting coal rocks, real-time video data for drum cutting, a real-time roof-to-floor cutting curve, a real-time drum height and a real-time traction speed. The preset condition is a memory roof-to-floor cutting curve, a memory drum height and a memory traction speed based on manual intervention.

The coal rock distribution determining module 10103 is configured to determine the sample coal rock distribution based on the real-time roof-to-floor cutting curve, the real-time drum height and the real-time traction speed.

The sample data determining module 10104 is configured to determine the real-time current data as the sample current data, the real-time pressure data as the sample pressure data, the real-time vibration data as the sample vibration data, the real-time noise data as the sample noise data, and the real-time video data as the sample video data.

With regards to the apparatus in the above embodiments, the specific way in which each module performs the operation has been described in embodiments of the method and will not be elaborated here.

The beneficial effect obtained by the apparatus for cutting control of the shearer in embodiments of the disclosure is same as the beneficial effect obtained by the method for cutting control of the shearer in embodiments of the disclosure, which will not be repeated here.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope of the embodiments in the present disclosure are given by the appended claims.

It should be noted that various forms of the processes shown above may be used to reorder, add, or delete steps. For example, the blocks/steps described in the present disclosure may be executed in parallel, sequentially, or in a different order, as long as the desired result of the technical solution disclosed in the present disclosure may be achieved, which will not be limited herein.

The above implementations do not constitute a limitation of the protection scope of the present disclosure. Those skilled in the art shall understand that various modifications, combinations, sub-combinations and substitutions may be made according to design requirements and other factors. Any modification, equivalent substitution and improvement, etc., made within the principle of the present disclosure shall be included within the protection scope of the present disclosure.

In the descriptions of the specification, the descriptions with reference to terms "one embodiment", "some embodiments", "examples", "example embodiments" etc. mean specific features, structures, materials or characteristics described in conjunction with the embodiment or example are included in at least one embodiment or example of the present disclosure. The illustrative expressions of the above terms in various places throughout this specification are not necessarily referring to the same embodiment or example of the disclosure. Moreover, specific features, structures, materials or characteristics described may be combined in any one or more embodiments or examples in a suitable manner. In addition, those skilled in the art may combine different embodiments or examples and the features of different embodiments or examples described in this specification without contradicting each other.

In addition, terms such as "first" and "second" are used herein for purposes of description and are not intended to indicate or imply relative importance or significance, or implicitly specify a number of the indicated technical features. Thus, the feature defined with "first" and "second" may explicitly indicate or implicitly include at least one of this feature. In the description of the present disclosure, "a plurality of" means at least two, for example two, three, etc., unless otherwise specified.

Any process or method descriptions described in the flowchart or in other ways herein may be understood as a module, a segment or a part of codes including one or more executable instructions configured to implement the steps of customized logical functions or processes, and scopes of preferred embodiments of the present disclosure include additional implementations, which may include implement the functions in an order that includes an order in the substantially simultaneous manner or a reverse order according to the involved functions, without following the order shown or discussed. This should be understood by those skilled in the art of embodiments of the present disclosure.

The logic and/or step described in other manners herein or shown in the flow chart, for example, a particular sequence table of executable instructions for realizing the logical function, may be specifically achieved in any computer readable medium to be used by an instruction execution system, device or equipment (such as a system based on computers, a system comprising processors or other systems capable of obtaining the instructions from the instruction execution system, device and equipment and executing the instructions), or to be used in combination with the instruction execution system, device and equipment. As to the specification, "the computer readable medium" may be any device that may include, store, communicate, propagate or transfer programs to be used by or in combination with the instruction execution system, device or equipment. A more specific example of a computer readable medium (a non-exhaustive list) includes the followings: an electronic connector (an electronic device) with one or more cables, a portable computer disk box (a magnetic device), a random access memory (RAM), a read-only memory (ROM), an erasable programmable read-only memory (an EPROM or a flash memory), an optical fiber device, and a portable compact disk read-only memory (CDROM). In addition, the computer readable medium may even be a paper or other appropriate medium capable of printing programs thereon. This is because, for example, the paper or other appropriate medium may be optically scanned and then edited, decrypted or processed with other appropriate ways as required to obtain the programs in an electric manner, and then the programs may be stored in the computer memories.

It should be understood that each part of the disclosure may be realized by the hardware, software, firmware or their combination. In the above implementations, a plurality of steps or methods may be stored in a memory and implemented in software or firmware executed by a suitable instruction execution system. For example, if implemented in hardware, they may be implemented by any of the following techniques or their combination known in the art as in another implementation: a discrete logic circuit with logic gate circuits configured to achieve logic functions on data signals, a special integrated circuit with appropriate combined logic gate circuits, a programmable gate array (PGA), a field programmable gate array (FPGA), etc.

It may be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual function units in the embodiments of the disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be a ROM, a magnetic disk or CD, etc. Although the embodiments of the disclosure have been shown and described, it would be appreciated by those skilled in the art that the above embodiments are exemplary and cannot be construed to limit the disclosure. The changes, alternatives, and modifications may be made in the embodiments without departing from scope of the disclosure.

What is claimed is:

1. A method for training a coal rock interface recognition model, performed by a cloud server, the method comprising:
   receiving a sample coal rock distribution and sample multi-modal data from an edge processor, wherein the sample multi-modal data comprises: sample current data of a cutting motor, sample pressure data of a lift cylinder, sample vibration data of a cutting arm, sample noise data during cutting coal rocks and sample video data for drum cutting;
   acquiring a sample load state feature based on the sample vibration data and the sample noise data;
   acquiring a sample cutting feature of a coal rock interface based on the sample video data;
   acquiring a sample load feature for drum cutting based on the sample current data and the sample pressure data;
   calling the coal rock interface recognition model, and performing a decision-level fusion based on the sample load state feature, the sample cutting feature and the sample load feature to generate a sample predicted coal rock distribution; and
   training the coal rock interface recognition model based on the sample predicted coal rock distribution and the sample coal rock distribution to obtain a target coal rock interface recognition model.

2. The method according to claim 1, wherein acquiring the sample load state feature comprises:
   acquiring a trained vibration spectrum model and a trained sound recognition model;
   calling the trained vibration spectrum model, and acquiring a sample vibration feature based on the sample vibration data;
   calling the trained sound recognition model, and acquiring a sample sound feature based on the sample noise data; and
   acquiring the sample load state feature by performing a feature-level fusion on the sample vibration feature and the sample sound feature.

3. The method according to claim 1, wherein acquiring the sample cutting feature of the coal rock interface comprises:
   acquiring a trained deep adversarial network model; and
   calling the trained deep adversarial network model, and acquiring the sample cutting feature of the coal rock interface based on the sample video data.

4. The method according to claim 1, wherein acquiring the sample load feature for drum cutting based on the sample current data and the sample pressure data comprises:
   acquiring a trained load feature model; and
   calling the trained load feature model, and acquiring the sample load feature for drum cutting based on the sample current data and the sample pressure data.

5. A method for cutting control of a shearer, performed by an edge processor, comprising:
   receiving a target coal rock interface recognition model from a cloud server, wherein the target coal rock interface recognition model is trained by the cloud server based on a sample coal rock distribution and sample multi-modal data, and the sample multi-modal data comprises: sample current data of a cutting motor, sample pressure data of a lift cylinder, sample vibration data of a cutting arm, sample noise data during cutting coal rocks and sample video data for drum cutting;
   acquiring current data of a cutting motor, pressure data of a lift cylinder, vibration data of a cutting arm, noise data during cutting coal rocks and video data for drum cutting;
   acquiring a load state feature based on the vibration data and the noise data;
   acquiring a cutting feature of a coal rock interface based on the video data;
   acquiring a load feature for drum cutting based on the current data and the pressure data;
   calling the target coal rock interface recognition model, and generating a predicted coal rock distribution based on the load state feature, the cutting feature and the load feature;
   determining a target drum height and a target traction speed based on the predicted coal rock distribution; and
   sending the target drum height and the target traction speed to a controller of the shearer, so that a shearer is controlled to cut a coal seam.

6. The method according to claim 5, wherein acquiring the current data, the pressure data, the vibration data, the noise data and the video data comprises:
   acquiring, by a current sensor arranged on the cutting motor, the current data;
   acquiring, by a pressure sensor arranged within the lift cylinder for the cutting arm, the pressure data;
   acquiring, by a vibration sensor arranged on the cutting arm, the vibration data;
   acquiring, by a sound sensor arranged at a bottom of the cutting arm, a sound signal during cutting a coal wall, to acquire the noise data; and
   acquiring, by a video acquisition device arranged at the bottom of the cutting arm, a cutting coal rock image, to acquire the video data.

7. The method according to claim 5, further comprising:
   receiving a trained vibration spectrum model, a trained sound recognition model, a trained deep adversarial network model and a trained load feature model from the cloud server.

8. The method according to claim 5, further comprising:
   acquiring and sending the sample coal rock distribution and the sample multi-modal data to the cloud server, to obtain the target coal rock interface recognition model.

9. The method according to claim 8, wherein acquiring the sample coal rock distribution and the sample multi-modal data comprises:
   determining a memory roof-to-floor cutting curve, a memory drum height and a memory traction speed;
   when the shearer during cuts a coal seam in a preset condition, acquiring real-time current data of the cutting motor, real-time pressure data of the lift cylinder, real-time vibration data of the cutting arm, real-time noise data during cutting coal rocks, real-time video data for drum cutting, a real-time roof-to-floor cutting curve, a real-time drum height and a real-time traction speed, wherein the preset condition is a memory roof-to-floor cutting curve, a memory drum height and a memory traction speed based on manual intervention;

determining the sample coal rock distribution based on the real-time roof-to-floor cutting curve, the real-time drum height and the real-time traction speed; and determining the real-time current data as the sample current data, the real-time pressure data as the sample pressure data, the real-time vibration data as the sample vibration data, the real-time noise data as the sample noise data, and the real-time video data as the sample video data.

10. An intelligent control system, comprising:
a shear, configured to cut a coal seam;
a controller, configured to control a shear to cut the coal seam;
a current sensor, configured to acquire current data of a cutting motor;
a pressure sensor, configured to acquire pressure data of a lift cylinder;
a vibration sensor, configured to acquire vibration data of a cutting arm;
a sound sensor, configured to acquire noise data during cutting coal rocks;
a video acquisition device, configured to acquire video data for drum cutting;
a cloud server, configured to obtain a target coal rock interface recognition model by training a coal rock interface recognition model based on a sample coal rock distribution and sample multi-modal data from an edge processor, wherein the sample multi-modal data comprises: sample current data of the cutting motor, sample pressure data of the lift cylinder, sample vibration data of the cutting arm, sample noise data during cutting coal rocks and sample video data for drum cutting; and
an edge processor, configured to acquire a load state feature based on the vibration data and the noise data; acquire a cutting feature of a coal rock interface based on the video data; acquire a load feature for drum cutting based on the current data and the pressure data; receive the target coal rock interface recognition model from the cloud server, and generate a predicted coal rock distribution based on the load state feature, the cutting feature and the load feature; determine a target drum height and a target traction speed based on the predicted coal rock distribution; and send the target drum height and the target traction speed to the controller.

11. The system according to claim 10, wherein
the current sensor is arranged on the cutting motor,
the pressure sensor is arranged within the lift cylinder for the cutting arm,
the vibration sensor is arranged on the cutting arm,
the sound sensor is arranged at a bottom of the cutting arm, and
the video acquisition device is arranged at the bottom of the cutting arm.

12. The system according to claim 10, wherein the edge processor is further configured to receive a trained vibration spectrum model, a trained sound recognition model, a trained deep adversarial network model and a trained load feature model from the cloud server.

13. The system according to claim 10, wherein the edge processor is further configured to send the sample coal rock distribution and the sample multi-modal data to the cloud server, to obtain the target coal rock interface recognition model.

14. The system according to claim 10, wherein the sample coal rock distribution and the sample multi-modal data are acquired by:
determining a memory roof-to-floor cutting curve, a memory drum height and a memory traction speed;
when the shearer during cuts a coal seam in a preset condition, acquiring real-time current data of the cutting motor, real-time pressure data of the lift cylinder, real-time vibration data of the cutting arm, real-time noise data during cutting coal rocks, real-time video data for drum cutting, a real-time roof-to-floor cutting curve, a real-time drum height and a real-time traction speed, wherein the preset condition is a memory roof-to-floor cutting curve, a memory drum height and a memory traction speed based on manual intervention;
determining the sample coal rock distribution based on the real-time roof-to-floor cutting curve, the real-time drum height and the real-time traction speed; and
determining the real-time current data as the sample current data, the real-time pressure data as the sample pressure data, the real-time vibration data as the sample vibration data, the real-time noise data as the sample noise data, and the real-time video data as the sample video data.

15. The system according to claim 10, wherein the target coal rock interface recognition model is obtained by:
acquiring a sample load state feature based on the sample vibration data and the sample noise data;
acquiring a sample cutting feature of a coal rock interface based on the sample video data;
acquiring a sample load feature for drum cutting based on the sample current data and the sample pressure data;
calling the coal rock interface recognition model, and performing a decision-level fusion based on the sample load state feature, the sample cutting feature and the sample load feature to generate a sample predicted coal rock distribution; and
training the coal rock interface recognition model based on the sample predicted coal rock distribution and the sample coal rock distribution to obtain the target coal rock interface recognition model.

16. The system according to claim 15, wherein acquiring the sample load state feature comprises:
acquiring a trained vibration spectrum model and a trained sound recognition model;
calling the trained vibration spectrum model, and acquiring a sample vibration feature based on the sample vibration data;
calling the trained sound recognition model, and acquiring a sample sound feature based on the sample noise data; and
acquiring the sample load state feature by performing a feature-level fusion on the sample vibration feature and the sample sound feature.

17. The system according to claim 15, wherein acquiring the sample cutting feature of the coal rock interface comprises:
acquiring a trained deep adversarial network model; and
calling the trained deep adversarial network model, and acquiring the sample cutting feature of the coal rock interface based on the sample video data.

18. The system according to claim 15, wherein acquiring the sample load feature for drum cutting comprises:
   acquiring a trained load feature model; and
   calling the trained load feature model, and acquiring the sample load feature for drum cutting based on the sample current data and the sample pressure data.

* * * * *